United States Patent [19]
Hiraoka et al.

[11] Patent Number: 5,901,014
[45] Date of Patent: May 4, 1999

[54] THIN FILM MAGNETIC HEAD AND ASSEMBLY CONFIGURED TO REDUCE RISK OF DISCHARGE BETWEEN THE COIL AND THE CORE SLIDER

[75] Inventors: Shinji Hiraoka; Takeshi Ohwe; Yoshifumi Mizoshita, all of Kawasaki, Japan

[73] Assignee: Fujitsu Limited, Kawasaki, Japan

[21] Appl. No.: 08/774,558

[22] Filed: Dec. 30, 1996

Related U.S. Application Data

[63] Continuation-in-part of application No. 08/248,334, May 24, 1994, Pat. No. 5,612,840, and a continuation-in-part of application No. 08/613,601, Mar. 11, 1996, and a continuation of application No. 08/110,771, Aug. 23, 1993, abandoned.

[30] Foreign Application Priority Data

Aug. 10, 1993 [JP] Japan ..................................... 5-198673

[51] Int. Cl.$^6$ ....................................................... G11B 5/48
[52] U.S. Cl. ............................................................. 360/104
[58] Field of Search ............................................. 360/104

[56] References Cited

U.S. PATENT DOCUMENTS

| | | | |
|---|---|---|---|
| 4,167,765 | 9/1979 | Watrous | 360/104 |
| 4,700,250 | 10/1987 | Kuriyama | 360/104 |
| 4,761,699 | 8/1988 | Ainslie | 360/104 |
| 5,185,683 | 2/1993 | Oberg | 360/104 |
| 5,198,945 | 3/1993 | Blaeser | 360/109 |

FOREIGN PATENT DOCUMENTS

| | | |
|---|---|---|
| 57-20961 | 2/1982 | Japan . |
| 1124114 | 5/1982 | Japan . |
| 421918 | 1/1992 | Japan . |
| 4111217 | 4/1992 | Japan . |
| 4351712 | 12/1992 | Japan . |

*Primary Examiner*—A. J. Heinz
*Attorney, Agent, or Firm*—Greer, Burns & Crain Ltd.

[57] ABSTRACT

A magnetic head assembly includes a slider on which a magnetic head is mounted, a spring arm having a gimbal portion on which the slider is mounted, a wiring pattern provided on the spring arm and electrically connected to the magnetic head, and an insulating member provided between the slider and the gimbal portion of the spring arm.

13 Claims, 42 Drawing Sheets

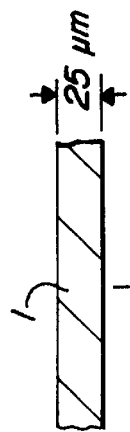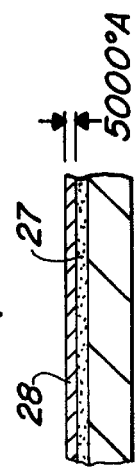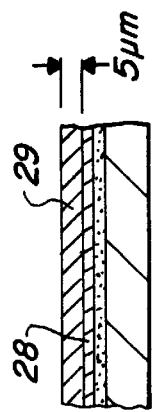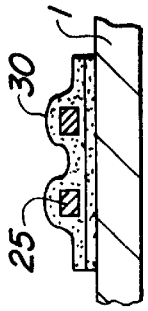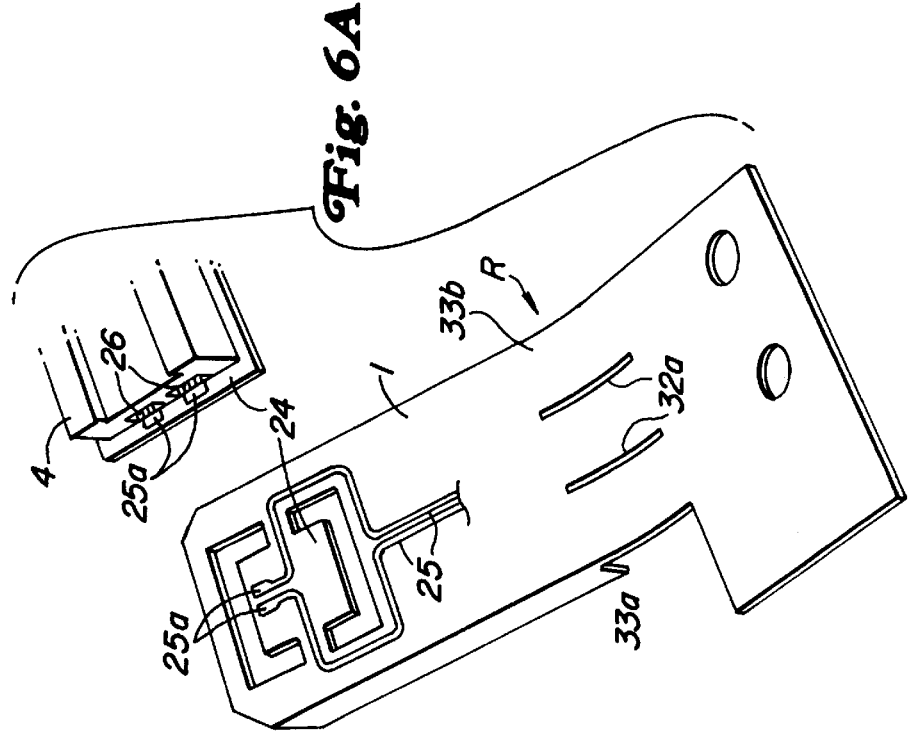

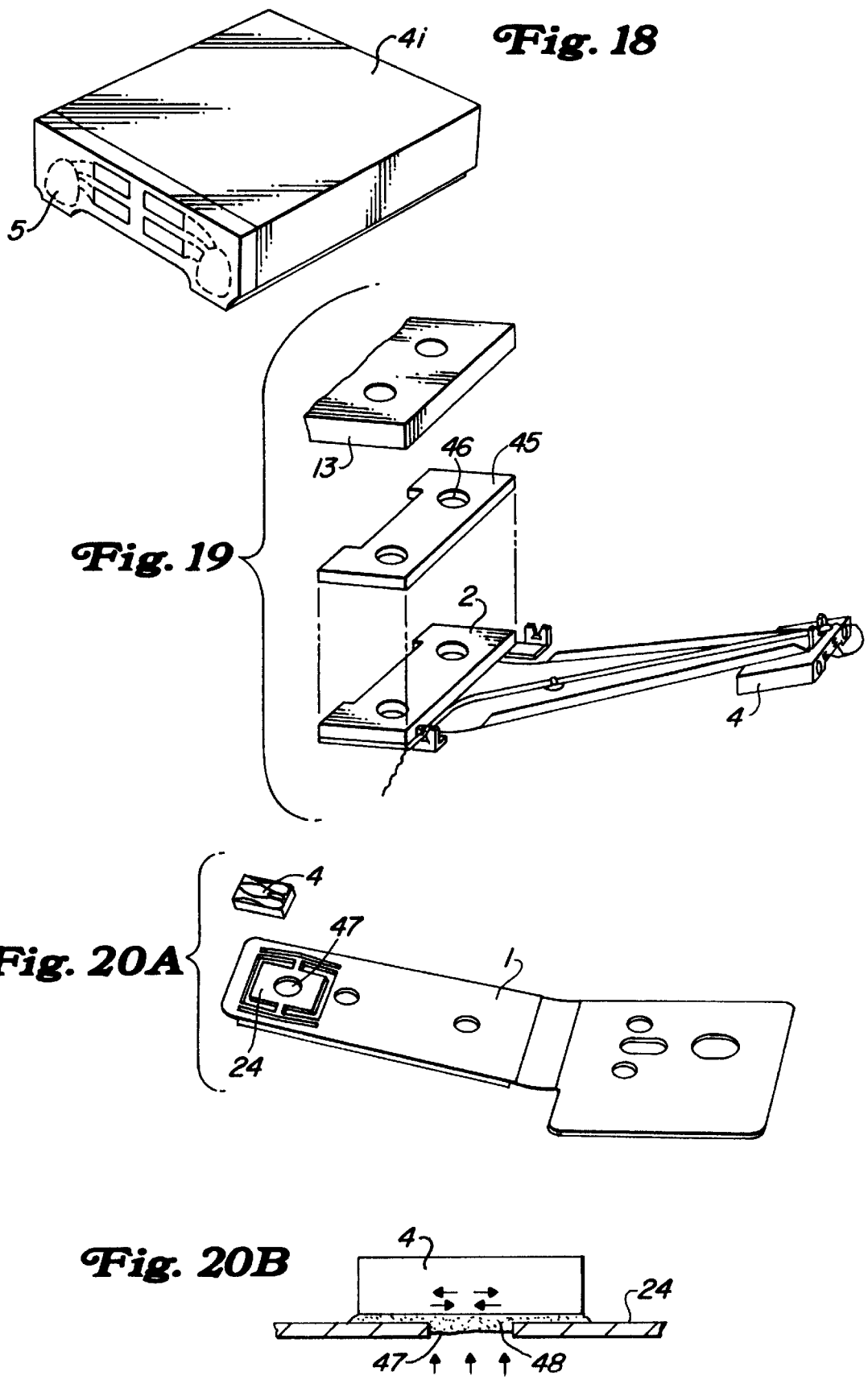

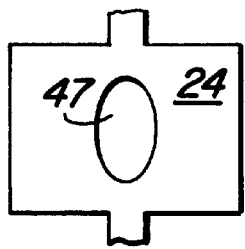 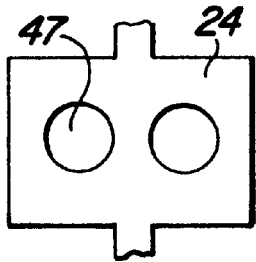 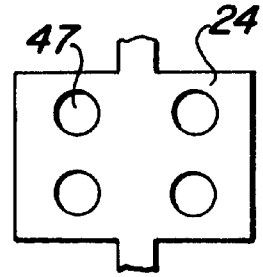
*Fig. 21A*   *Fig. 21B*   *Fig. 21C*
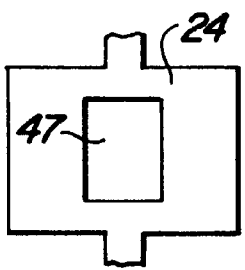 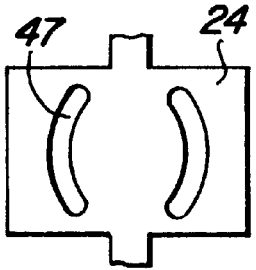 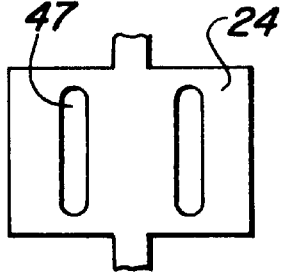
*Fig. 21D*   *Fig. 21E*   *Fig. 21F*

THIN FILM MAGNETIC HEAD AND ASSEMBLY CONFIGURED TO REDUCE RISK OF DISCHARGE BETWEEN THE COIL AND THE CORE SLIDER

CROSS-REFERENCE OF THE RELATED APPLICATION

This application is a Continuation-In-Part Application of U.S. patent application Ser. No. 248,334, filed May 24, 1994, now U.S. Pat. No. 5,612,840, and a Continuation-in-Part Application of U.S. patent application Ser. No. 613,601, filed Mar. 11, 1996, pending, which is a Continuation of U.S. patent application Ser. No. 110,771, filed Aug. 23, 1993, now abandoned.

BACKGROUND OF THE INVENTION

1. Field of the Invention

The present invention relates to a magnetic head assembly having a thin-film or MR type magnetic head used for a magnetic disk drive.

2. Description of the Related Art

Recently, in conventional magnetic disk drives, monolithic type magnetic heads have been replaced with thin-film or MR type magnetic heads.

FIG. 1A is an exploded view of an example of a magnetic head assembly (which can also be referred to as a magnetic head suspension unit) having a thin-film type magnetic head used for the conventional magnetic disk drives. FIG. 1B is an exploded view of a part of the magnetic head suspension unit shown in FIG. 1A. In the present specification, the magnetic head suspension unit refers to an assembly of a spring arm having a magnetic head mounted on an end of the spring arm. The other end of the spring arm is adapted to be mounted on a member of a magnetic head positioning mechanism.

Referring now to FIG. 1A, one end (a base portion 1a) of a spring arm (suspension) 1 formed of an elastic plate is mounted to a member of a magnetic head positioning mechanism (not shown in the figure) via a plate-like spacer 2. A gimbal 3 is mounted on another end 1b of the spring arm 1. The gimbal 3 is mounted, as shown in FIG. 1B, on the spring arm 1 by means of laser welding at positions indicated by x. A core slider (head slider) 4 of a magnetic head h is mounted by adhesive on the gimbal 3.

Two magnetic head elements 5 are formed on a rear side surface of the magnetic head, the magnetic head elements 5 being connected by lead wires 6 which lead to a read wire 8 covered with an insulating tube 7 fixed to the spring arm 1. The lead wire 8 is lead to a recording/reproducing circuit 9 shown in FIG. 2.

The spring arm 1 is slightly bent near the base portion 1a so that a bent portion 1c is formed so as to generate a spring force.

FIG. 2 is an exploded view of a conventional magnetic disk drive in which two magnetic head suspension units shown in FIG. 1A are used.

Two magnetic head suspension units are mounted on a driving arm 13 which pivots about an axis 12 so that a magnetic disk 10 accommodated inside the magnetic head drive is sandwiched between two of the core sliders 4 mounted on the respective spring arms 1. Each of the core sliders 4 is pressed to a respective surface of the magnetic disk 10 by the spring force generated by the bent portion 1c.

When the magnetic disk 10 is rotated at a high speed, the magnetic heads h float, if the magnetic heads h are of the floating type, on the respective surface of the magnetic disk 10 due to an air flow generated by the rotation of the magnetic disk 10. If the magnetic heads h are contact type magnetic heads, the magnetic heads h do not float, but instead slide on the respective surfaces of the magnetic disk 10. The magnetic heads h are moved to respective target tracks on the surfaces of the magnetic disk 10 by pivoting the spring arms about the axis 12.

FIG. 3 is a perspective view of a thin-film type magnetic head. FIG. 4 is an enlarged cross sectional view of the thin-film type magnetic head shown in FIG. 3 taken along a line 4—4 of FIG. 3.

The thin-film type magnetic head shown in FIG. 3 comprises the slider 4 and head elements 5. The head elements 5 are formed by means of a film deposition technique and lithography. Terminals 15a and 15b for recording/reproducing coils are provided near the head elements 5.

Each of the head elements 5 comprises a lower magnetic pole 16, an upper magnetic pole 17 and a thin-film coil 19 wound around a connecting portion 18 between the lower magnetic pole 16 and the upper magnetic pole 17. A gap insulating layer 20 is provided between the lower magnetic pole 16 and the upper magnetic pole 17 so that a gap G having a predetermined width is formed between the two poles. The gap G faces the surface of the magnetic disk 10 to perform an magnetic recording/reproducing operation.

In the construction of the magnetic head suspension unit shown in FIG. 1 in which the lead wire 8 is covered with the insulating tube 7, the insulating tube 7 occupies a relatively large space to prevent miniaturization of the magnetic disk drive. Additionally, the insulating tube 7 makes an assembling operation difficult, particularly an automated assembling operation. Further, there is a strong possibility that the lead wire 8 will pick up noises, resulting in degradation of a S/N ratio of a signal sent via the lead wire 8.

In order to eliminate the above-mentioned problems, a method for forming a signal transmitting line on a spring arm is suggested in Japanese Laid-Open Patent Application No. 4-21918. In the method, a signal line is formed of a pattern of a conductive layer on an insulating layer formed on the spring arm. However, the method has a problem in that the signal transmitting line formed of the conductive layer is easily damaged or broken during a process for forming the bent portion 1c shown in FIG. 1A.

Japanese Laid-Open Patent Application No. 4-111217 discloses a magnetic head suspension unit in which a flexible printed circuit board is attached to a spring arm, and a portion of the flexible circuit board corresponding to the above of the spring arm bent portion is not adhered to the spring arm. Instead, in this construction, the portion of the flexible printed circuit board corresponding to the bent portion of the spring arm is free, and thus there is no bending stress applied to the flexible printed circuit board. However, this construction cannot be applied to a highly miniaturized spring arm such as a spring arm having a thickness of a few microns and a 4.6 mm width.

There is another problem in that the ability of the insulating layers 21 and 22 of the magnetic head element 5 to withstand dielectric voltage is very low because they each have a thickness of only 1 to a few microns. Accordingly, if a relatively high voltage of about 100V or more is applied between the thin-film coil 19 and the poles 16 and 17 due to a generation of static electricity, the insulating layers 21 and 22 may be easily damaged due to electric discharge.

If the insulation between the thin-film coil 19 and the poles 16 or 17 is damaged, an electric discharge may occur between the core slider, which is made of a conductive material such as $Al_2O_3TiC$, and the magnetic poles 16 or 17, resulting in the gap G or the floating surface of the core slider 4 being damaged. Additionally, when the magnetic disk drive is in operation, an electric discharge may occur between the magnetic disk 10 and the magnetic poles 16 or 17, resulting in the magnetic gap G being damaged. When the core slider 4 is damaged, the floating characteristic of the magnetic head is deteriorated, which condition causes a generation of noises in the recording/reproducing signal. If the magnetic head is a contact type head, the damaged surface of the magnetic head may scratch the magnetic disk 10.

Problems similar to the above-mentioned problems may occur when the core slider is miniaturized. That is, when the magnetic head is heated, the magnetic head tends to expand due to thermal expansion, but a portion of the core slider attached to the gimbal or the spring arm by adhesive cannot expand in accordance with the expansion of the magnetic head. This creates bending of the core slider, and thus the floating characteristic of the magnetic head may be deteriorated.

SUMMARY OF THE INVENTION

It is a general object of the present invention to provide an improved and useful magnetic head assembly and a magnetic disk drive having such a magnetic head suspension unit in which the above-mentioned disadvantages are eliminated.

A more specific object of the present invention is to provide a magnetic head assembly and a magnetic disk drive in which damaging of a conductive-pattern layer formed on a spring arm during a process of bending the spring arm can be prevented.

Another object of the present invention is to provide a magnetic head assembly and a magnetic disk drive in which no insulation breakage occurs due to generation of static electricity.

Another object of the present invention is to provide a magnetic head assembly and a magnetic disk drive in which thermal deformation of a slider core is prevented.

In order to achieve the above-mentioned objects, there is provided according to the present invention, a magnetic head assembly comprising:

a slider on which a magnetic head is mounted;

a spring arm having a gimbal portion on which the slider is mounted;

a wiring pattern provided on the spring arm and electrically connected to the magnetic head; and an insulating member provided between the slider and the gimbal portion of the spring arm.

The magnetic head assembly may be configured so that the insulating member comprises an insulation adhesive.

The magnetic head assembly may be configured so that the insulating member comprises an adhesive containing an insulator.

The magnetic head assembly may be configured so that the insulating member comprises: a projection which has an insulation surface and is mounted on the gimbal portion; and an adhesive which fixes the slider which is in contact with the insulation surface of the projection to the gimbal portion.

The magnetic head assembly may be configured so that the adhesive is substantially flush with the insulation surface of the projection.

The above objects of the present invention are also achieved by a magnetic head assembly comprising:

a slider on which a magnetic head is mounted;

a spring arm having a gimbal portion on which the slider is mounted, the gimbal portion including a recess portion;

a wiring pattern provided on the spring arm and electrically connected to the magnetic head; and an adhesive provided between the gimbal portion and the slider, the adhesive being partially or fully provided in the recess portion.

The magnetic head assembly may be configured so that the recess portion comprises at least one through hole formed in the gimbal portion.

The magnetic head assembly may be configured so that the recess portion comprises at least one longitudinal hole formed in the gimbal portion.

The magnetic head assembly may be configured so that the recess portion comprises at least one circular hole formed in the gimbal portion.

The magnetic head assembly may be configured so that the recess portion comprises a rectangular through hole formed in the gimbal portion.

The magnetic head assembly may be configured so that the gimbal portion is integrally formed with the spring arm.

The above objects of the present invention are also achieved by a magnetic disk drive comprising:

an enclosure;

a magnetic disk provided in the enclosure;

a magnetic head assembly provided in the enclosure; and an actuator to which the magnetic head assembly is fixed, the actuator moving the magnetic head assembly above the magnetic disk. The magnetic head assembly comprises:

a slider on which a magnetic head is mounted;

a spring arm having a gimbal portion on which the slider is mounted;

a wiring pattern provided on the spring arm and electrically connected to the magnetic head; and an insulating member provided between the slider and the gimbal portion of the spring arm.

The above objects of the present invention are also achieved by a magnetic disk drive comprising:

an enclosure;

a magnetic disk provided in the enclosure;

a magnetic head assembly provided in the enclosure; and an actuator to which the magnetic head assembly is fixed, the actuator moving the magnetic head assembly above the magnetic disk. The magnetic head assembly comprises:

a slider on which a magnetic head is mounted;

a spring arm having a gimbal portion on which the slider is mounted, the gimbal portion including a recess portion;

a wiring pattern provided on the spring arm and electrically connected to the magnetic head; and an adhesive provided between the gimbal portion and the slider, the adhesive being partially or fully provided in the recess portion.

BRIEF DESCRIPTION OF THE DRAWINGS

The other objects, features and advantages of the present invention will be apparent from the following detailed description when read in conjunction with the accompanying drawings, in which:

FIG. 6A is a perspective view of the spring arm shown in FIG. 5A in a state where a magnetic head has not been mounted on a gimbal;

FIGS. 6B1–6B6 illustrate a process for forming conductive-pattern layers on the spring arm;

FIG. 18 is a perspective view of an essential part of a tenth embodiment of a magnetic head assembly according to the present invention;

FIG. 19 is an exploded view of an eleventh embodiment of a magnetic head assembly according to the present invention;

FIG. 20A is a perspective view of a spring arm of a twelfth embodiment of a magnetic head assembly according to the present invention;

FIG. 20B is an enlarged cross sectional view of a mounting structure of the core slider shown in FIG. 20A;

FIGS. 21A through 21F are illustrations of variations of the hole shown in FIG. 20A.

DETAILED DESCRIPTION OF THE PREFERRED EMBODIMENTS

Figure 1A:
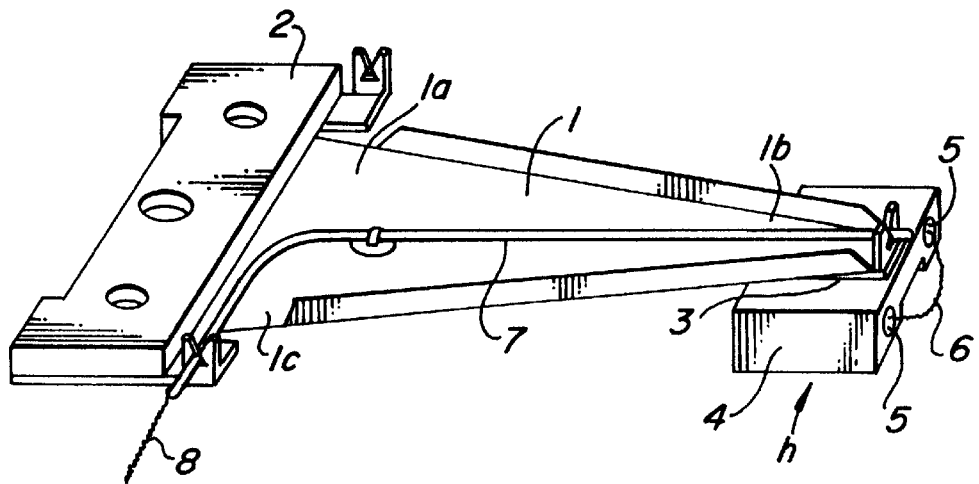
FIG. 1A is an exploded view of an example of a magnetic head assembly having the thin-film type magnetic head used for the conventional magnetic disk drives.
Figure 5A:
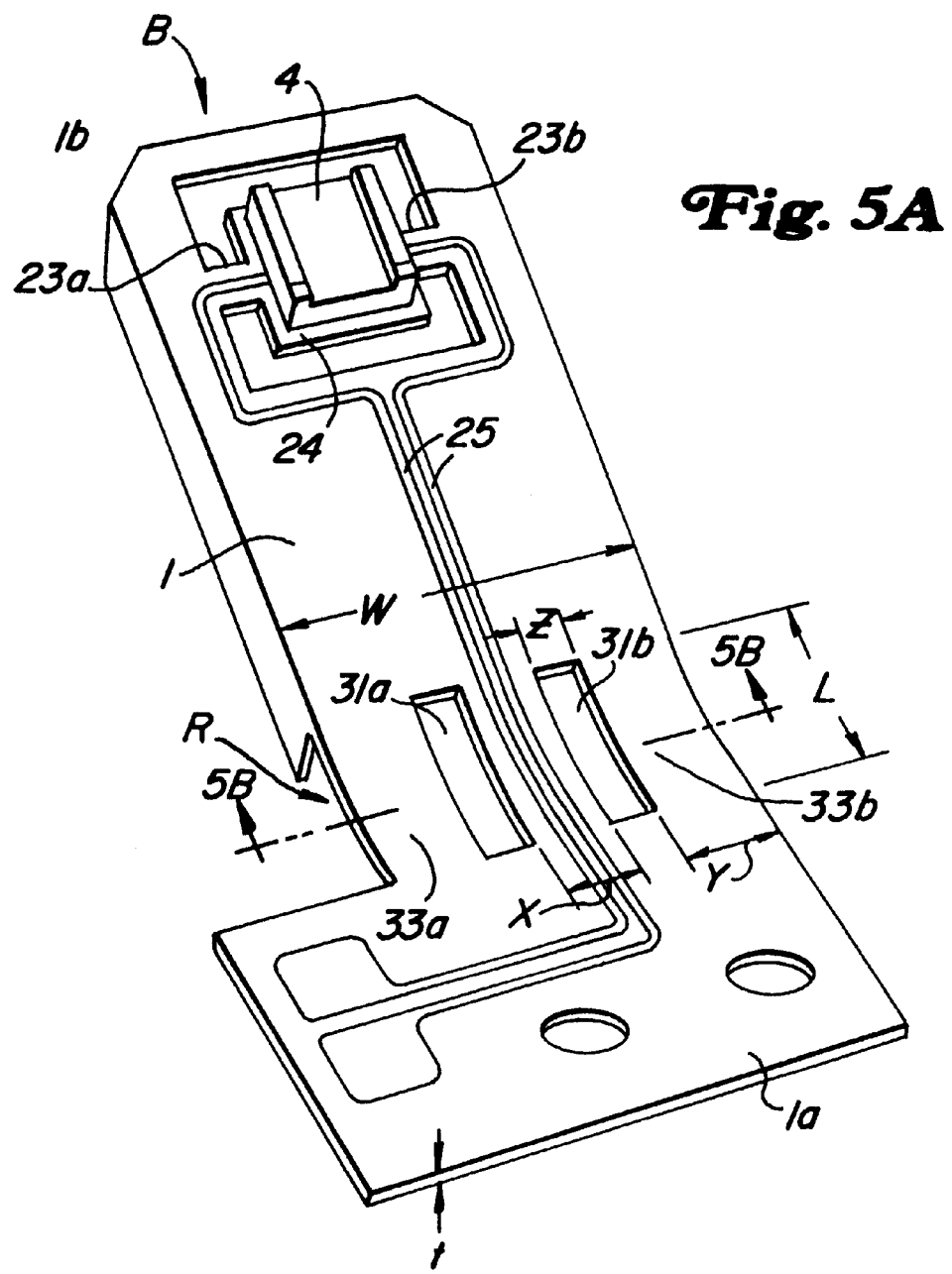
FIG. 5A is a perspective view of a first embodiment of a magnetic head assembly according to the present invention.
Figure 5B:
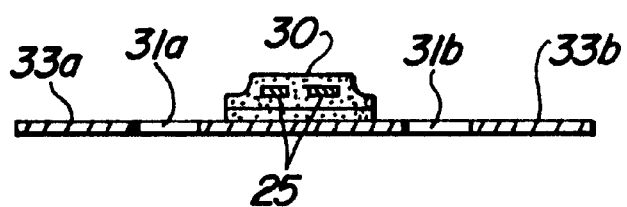
FIG. 5B is an enlarged cross sectional view taken along a line 5B—5B of FIG. 5A.

A description will now be given, with reference to FIGS. 5A and 5B, of a first embodiment of the present invention. FIG. 5A is a perspective view of a first embodiment of a magnetic head assembly according to the present invention, and FIG. 5B is an enlarged cross sectional view taken along a line b—b of FIG. 5A. Hereinafter, the magnetic head assembly is also referred to a magnetic head suspension unit or merely suspension unit. In FIGS. 5A and 5B, parts that are the same as the parts shown in FIG. 1A are given the same reference numerals, and descriptions thereof will be omitted.

The first embodiment according to the present invention comprises the spring arm 1 and the slider core 4 of the magnetic head. A gimbal 24 supported by bridge portions 23a and 23b is formed on the end 1b of the spring arm 1. The core slider (head slider) 4 of the magnetic head is mounted on the gimbal 24 by an adhesive which has an insulation effect and can be an insulation adhesive or an adhesive containing an insulator. The insulation adhesive is an insulator in which the insulator itself has the insulation effect.

The base portion (attachment portion) 1a of the spring arm 1 is fixed to a member of a magnetic head positioning mechanism. Conductive-pattern layers 25 run from the base portion 1a to the gimbal 24 so as to transmit signals to/from the magnetic head.

FIG. 6A is a perspective view of the spring arm 1 shown in FIG. 5A in a state where the magnetic head has not been mounted on the gimbal 24. In FIG. 6A, a portion of the core slider 4 is also shown to explain electrical connection between the magnetic head and the conductive-pattern layers 25. A pad 25a is formed at the end of each of the two conductive-pattern layers 25. The core slider of the magnetic head is also provided with pads 26. When the core slider 4 is mounted on the gimbal 24, the pads 26 make contact with the respective pads 25a. The pads 26 and the pads 25a are then soldered together to assure an electric connection. It should be noted that the core slider 4 in FIG. 6A is viewed from a direction indicated by an arrow B of FIG. 5A.

Figure 2:
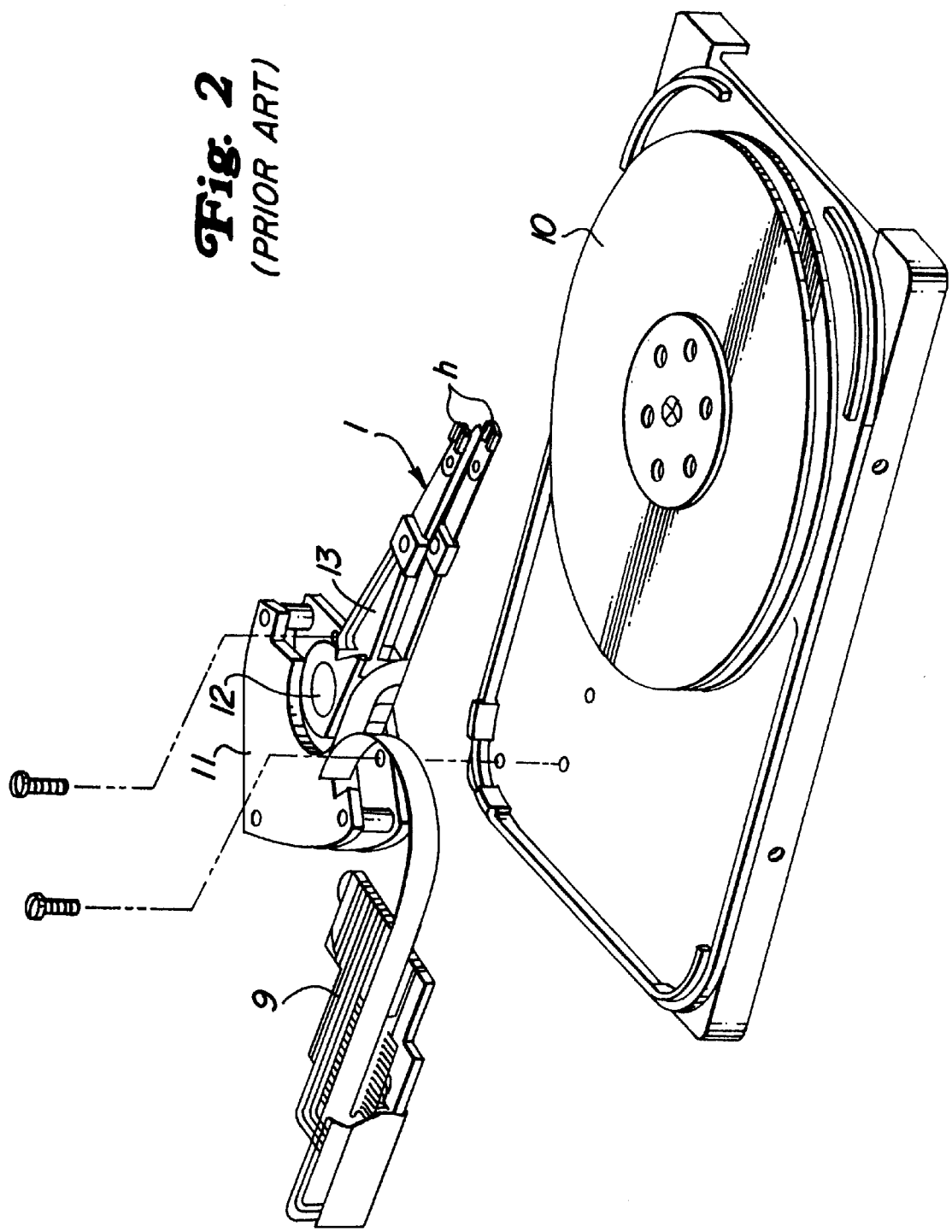
FIG. 2 is an exploded view of a conventional magnetic disk drive in which two magnetic head assemblies shown in FIG. 1A are used.
Figure 3:
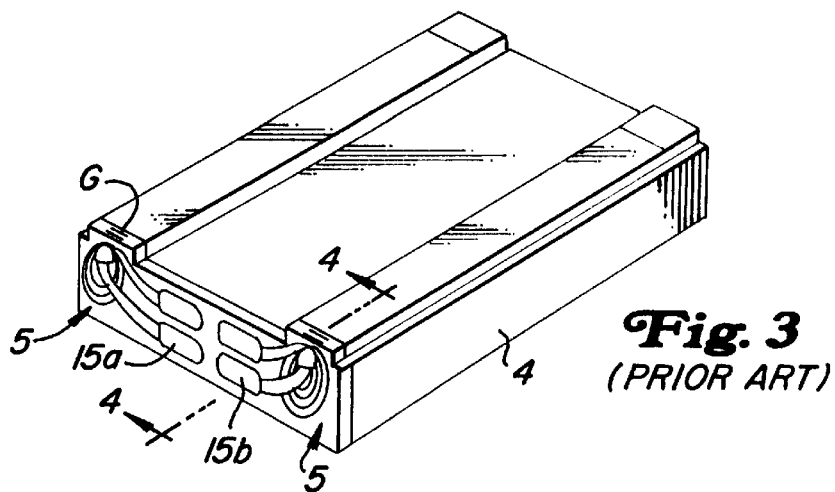
FIG. 3 is a perspective view of a thin-film type magnetic head.

The conductive-pattern layers 25 on the spring arm 1 are formed by a process shown in FIG. 6B. As shown by FIG. 6B-2, an insulating layer 27 is formed on the spring arm 1 by applying a polyimide resin over the spring arm 1 made of stainless steel. The thickness of the spring arm 1 is about 25 $\mu$m, and the thickness of the insulating layer 27 is 3–4 $\mu$m. A base layer 28 is then formed on the insulating layer 27, as shown in FIG. 6B-3, by sputtering copper (Cu) onto the insulating layer 27. The base layer 28 may instead be formed by vapor deposition or chemical plating.

Figure 4:
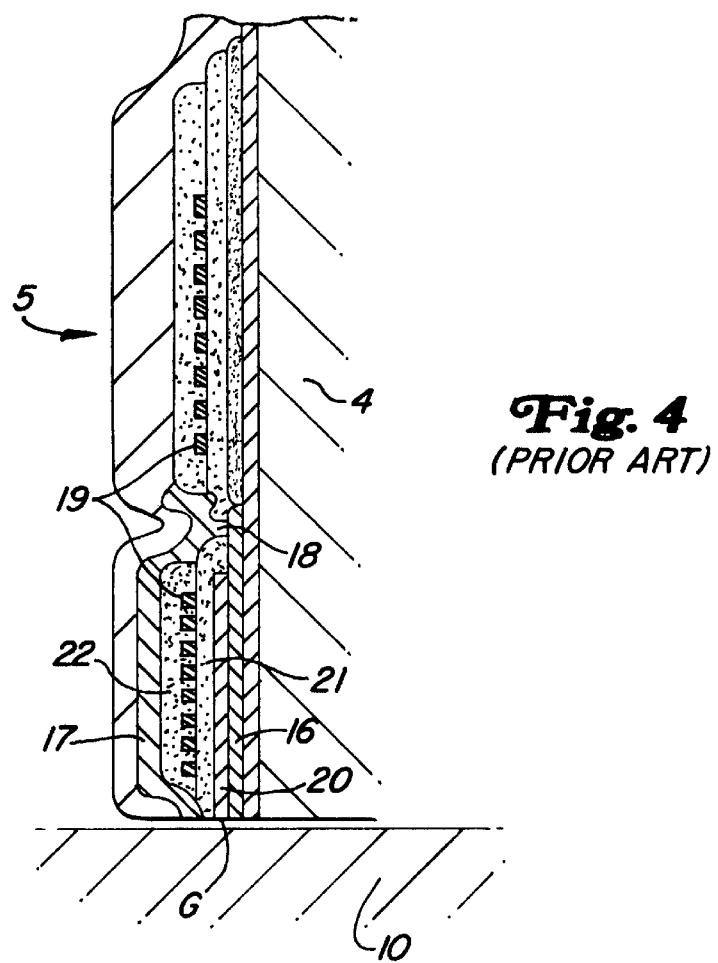
FIG. 4 is an enlarged cross sectional view of the thin-film type magnetic head shown in FIG. 3 taken along a line A—A of FIG. 3.

Using the base layer 28, electro plating is performed to form a copper layer 29 on the base layer 28, as shown in FIG. 6B-4. As shown in FIG. 6B-5, the base layer 28 and the copper layer 29 are etched so that the conductive-pattern layers 25 remain on the spring arm 1. Lastly, polyimide resin is applied over the conductive-pattern layers 25 so as to form an insulating film 30 which covers the conductive-pattern layers 25 to protect them.

If a bending process is performed by applying a pressing force to the conductive-pattern layers 25 formed on the spring arm 1, the conductive-pattern layers 25 may be damaged or destroyed. In order to eliminate this problem, in the first embodiment of the present invention, rectangular holes 31a and 31b are formed on the spring arm 1, as shown in FIG. 5A, on either side of the conductive-pattern layers 25. The rectangular holes 31a and 31b separate a portion of the spring arm 1, on which the conductive-pattern layers 25 are formed, from bent portions 33a and 33b to which a pressing force is applied to bend the spring arm 1. The rectangular holes 31a and 31b may instead be slits 32a and 32b as shown in FIG. 6A.

Figure 7A:
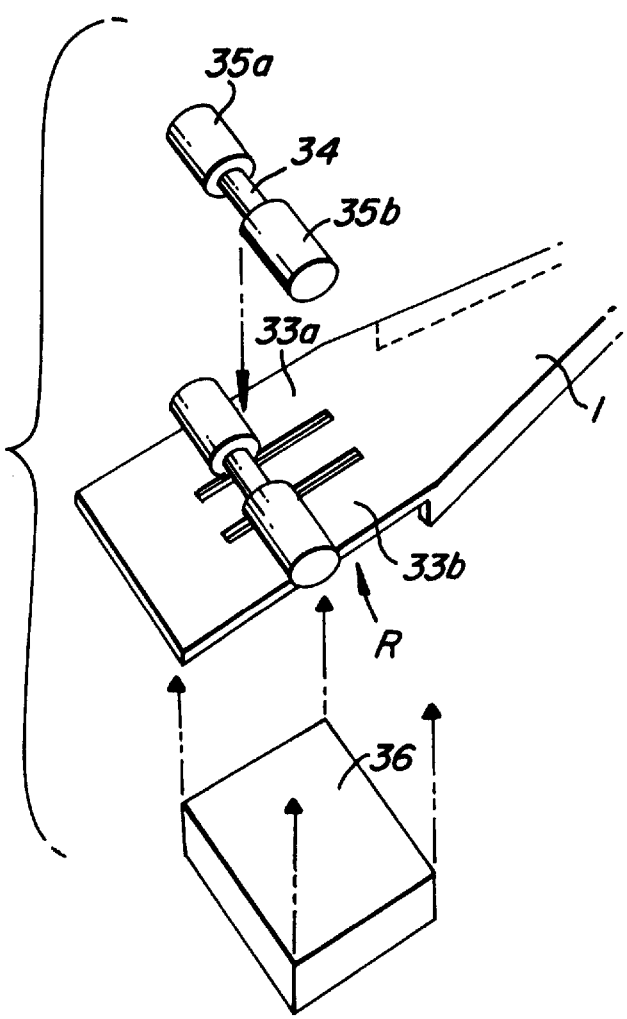
FIGS. 7A through 7C are illustrations showing a process for bending the bent portions shown in FIG. 6A.
Figure 7B:
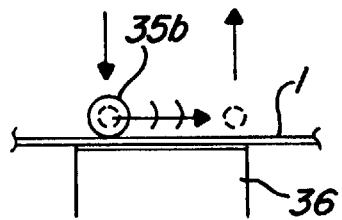
Figure 7C:
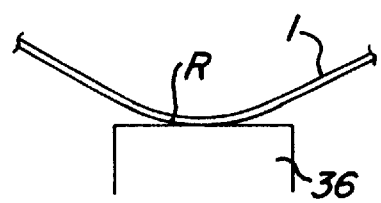

FIGS. 7A through 7C are illustrations showing a process for bending the bent portions 33a and 33b. As shown in FIG. 7A, first a roller 34 having larger diameter portions 35a and 35b is prepared. The larger diameter portions 35a and 35b bend the corresponding bent portions 33a and 33b. The bent portions 33a and 33b, which are formed as an elastic portion R generating an elastic force, of spring arm 1 are placed on a rubber table 36. The roller 34 is then rolled, as shown in FIG. 7B, on the bent portion 33a and 33b while it is being pressed. As a result, only the bent portions 33a and 33b are permanently deformed into an arc-like shape, while the portion of the spring arm 1, on which portion the conductive-pattern layers are formed, between the bent portions 33a and 33b is elastically deformed.

According to the present embodiment, the roller 34 is not pressed on the portion where the conductive-pattern layers 25 have been formed, and thus no damage to the conductive-pattern layers 25 occurs.

Figure 8A:
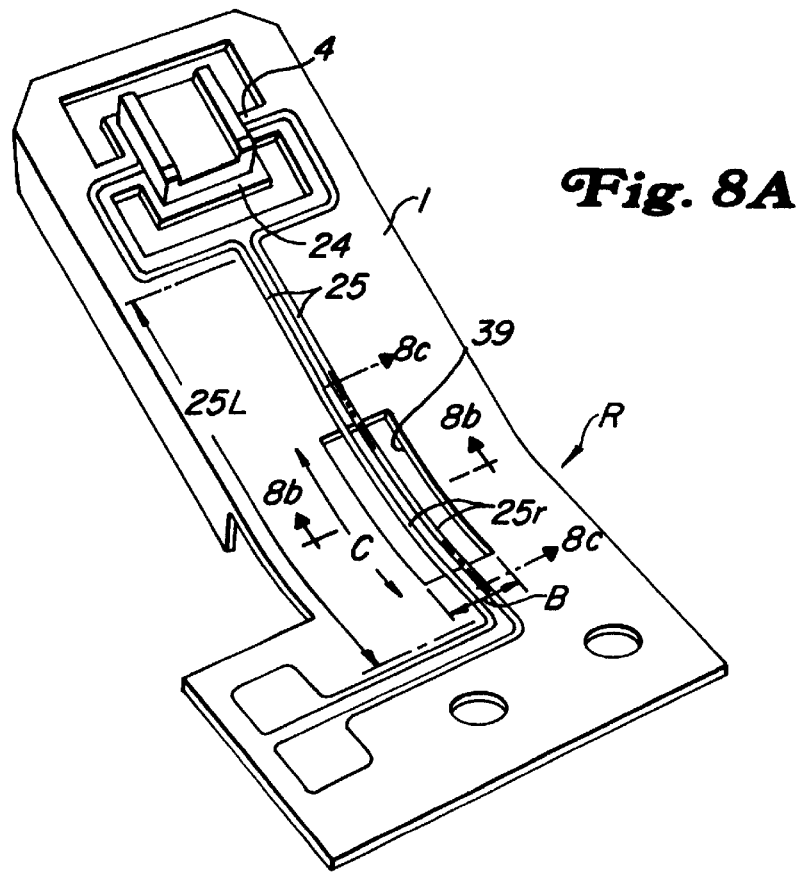
FIG. 8A is a perspective view of a second embodiment of a magnetic head assembly according to the present invention.
Figure 8B:
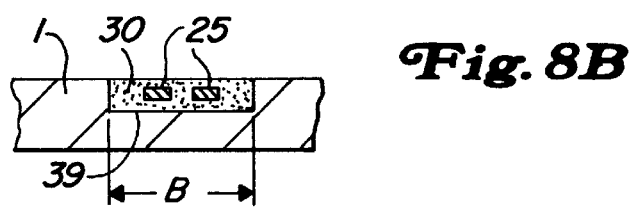
FIG. 8B is an enlarged partial cross sectional view taken along a line 8B—8B of FIG. 8A.
Figure 8C:
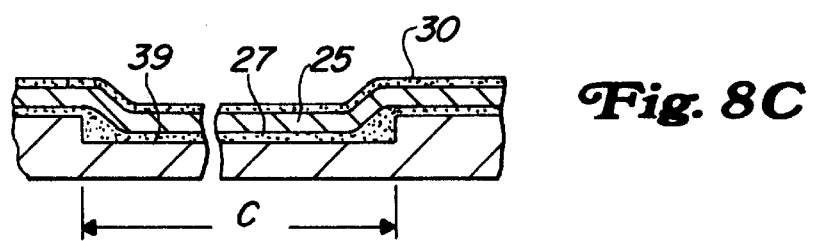
FIG. 8C is an enlarged partial cross sectional view taken along a line 8C—8C of FIG. 8A.
Figure 8D:
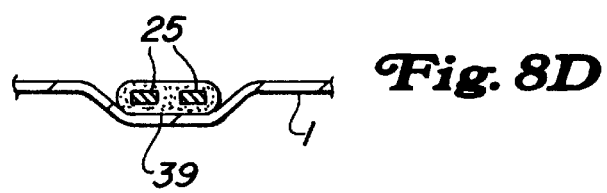
FIG. 8D is a partial cross sectional view of a variation of the spring arm shown in FIG. 8A.

A description will now be given, with reference to FIGS. 8A through 8D, of a second embodiment according to the present invention. FIG. 8A is a perspective view of a second embodiment of a magnetic head suspension unit according to the present invention; FIG. 8B is an enlarged partial cross sectional view taken along a line 8B—8B of FIG. 8A; FIG. 8C is an enlarged partial cross sectional view taken along a line 8C—8C of FIG. 8A. FIG. 8D is a partial cross sectional view of a variation of the spring arm shown in FIG. 8A.

In the present embodiment, a recessed portion 39 is formed in the elastic portion R where an elastic force is generated. The conductive-pattern layers 25 are formed in the recessed portion 39. The recessed portion 39 covers an entire length C of the elastic portion R and a width B so as to cover the portions of the conductive-pattern layers 25 located in the elastic portion R of the spring arm 1.

In this embodiment, a portion of the insulating layer 27 shown in FIG. 6B-2 is formed also inside the recessed portion 39. The base layer 28 and the copper layer 29 are then formed on the entire surface of the insulating layer 27 including the portion thereof inside the recessed portion 39 so as to form the conductive-pattern layers 25. Lastly, the insulating layer 30 is formed on the conductive-pattern layers 25 so that a top surface of the insulating layer 30 located inside the recessed portion 39 is below the surface of the spring arm 1 as shown in FIG. 8B.

In the present invention, since the portion inside the recessed portion 39 does not come into contact with the roller for forming the bent portions even though the roller has a straight cylindrical surface, no damage occurs to the conductive-pattern layers 25, the same as in the case of the above-mentioned first embodiment.

Although in the above embodiment the recessed portion 39 is formed by means of etching, the recessed portion 39 may instead be formed by means of press forming as shown in FIG. 8D. By using press forming, the recessed portion 39 can be formed even if the thickness of the spring arm 1 is very slight or the total thickness of the insulating layers 27 and 30 and the conductive-pattern layers 25 is great. The recessed portion 39 may be formed so that an entire length 25L of straight portions of the conductive-pattern layers 25 is embedded in the recessed portion 39.

Figure 9A:
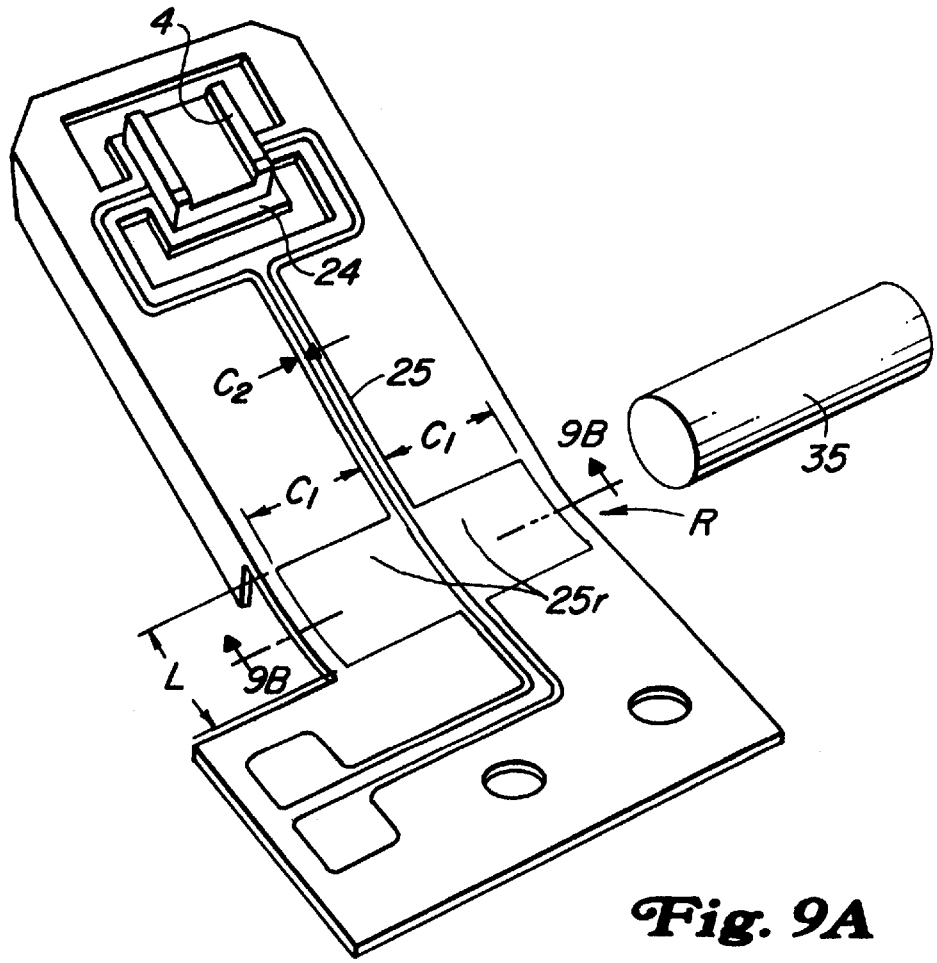
FIG. 9A is a perspective view of a third embodiment of a magnetic head assembly according to the present invention.
Figure 9B:
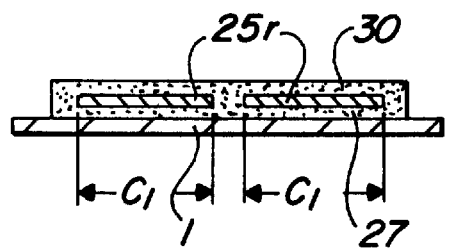
FIG. 9B is a cross sectional view taken along a line 9B—9B of FIG. 9A.

A description will now be given, with reference to FIGS. 9A and 9B, of a third embodiment according to the present invention. FIG. 9A is a perspective view of a third embodiment of a magnetic head suspension unit according to the present invention; FIG. 9B is a cross sectional view taken along a line 9B—9B of FIG. 9A.

In the present embodiment, portions 25r of the conductive-pattern layers 25, corresponding to the elastic portion R which generates an elastic force, are wider than other portions of the conductive-pattern layers 25. That is, a width $C_1$ of each of the portion 25r of the conductive-pattern layers 25 within the elastic portion R is widened over a length L corresponding to the elastic portion R. The total thickness of the conductive-pattern layers 25 and insulating layers 27 and 30 is uniform over the entire width of the widened portions 25r of the conductive-pattern layers 25. A roller 35 having a straight cylindrical surface is pressed over the entire width of the elastic portion R so as to bend the elastic portion R.

If the conductive-pattern layers 25 or the insulating layer 30 in the elastic portion R are protruded as shown in FIG. 6B, the pressing force exerted by the roller 35 is concentrated onto the conductive-pattern layers 25. However, in the present embodiment, the pressing force is dispersed onto the entire width of the widened conductive-pattern layers 25, and thus damage or breakage of the conductive-pattern layers 25 is prevented. Additionally, even if damage such as a cracking of portions of the conductive-pattern layers 25 occurs, other portions of the layers 25 which are not damaged, resulting in reliable electric continuity. In the present embodiment, the width c1 of each of the portion 25r of the conductive-pattern layers 25 is 2.0 mm, and the length L is 1.5 mm.

Figure 10:
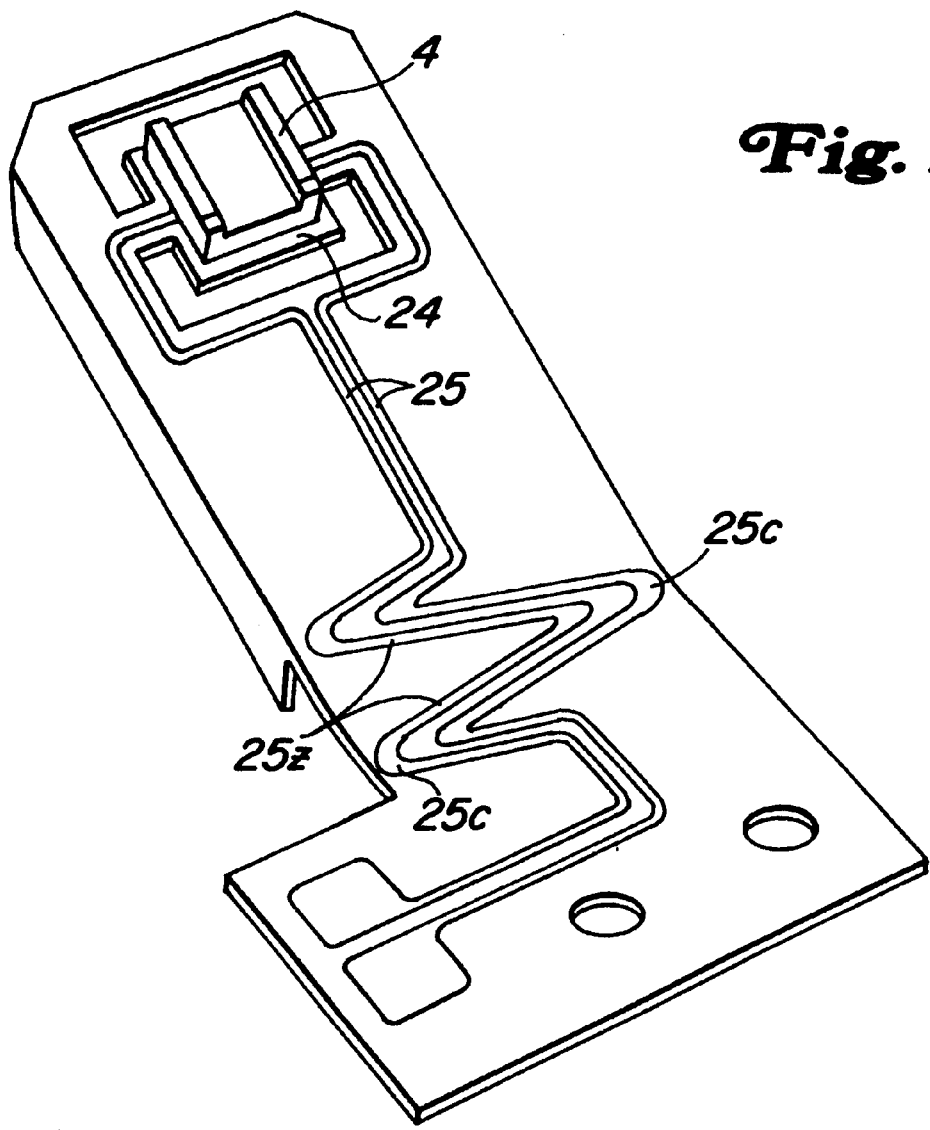
FIG. 10 is a perspective view of a fourth embodiment of a magnetic head assembly according to the present invention.

A description will now be given, with reference to FIG. 10, of a fourth embodiment according to the present invention. FIG. 10 is a perspective view of a fourth embodiment of a magnetic head suspension unit according to the present invention.

In the present embodiment, zigzagging conductive-pattern portions 25z of the conductive-pattern layers 25 within the elastic portion R are formed to extend in a direction oblique to a direction in which other portions of the conductive-pattern layers 25 extend. Preferably, U-turn portions 25c are formed with a width greater than other portions. As a result, in the present embodiment, pressing force is dispersed over the contacting area of the roller to be pressed, thus reducing damaging and breakage of the conductive-pattern layers 25.

Figure 11A:
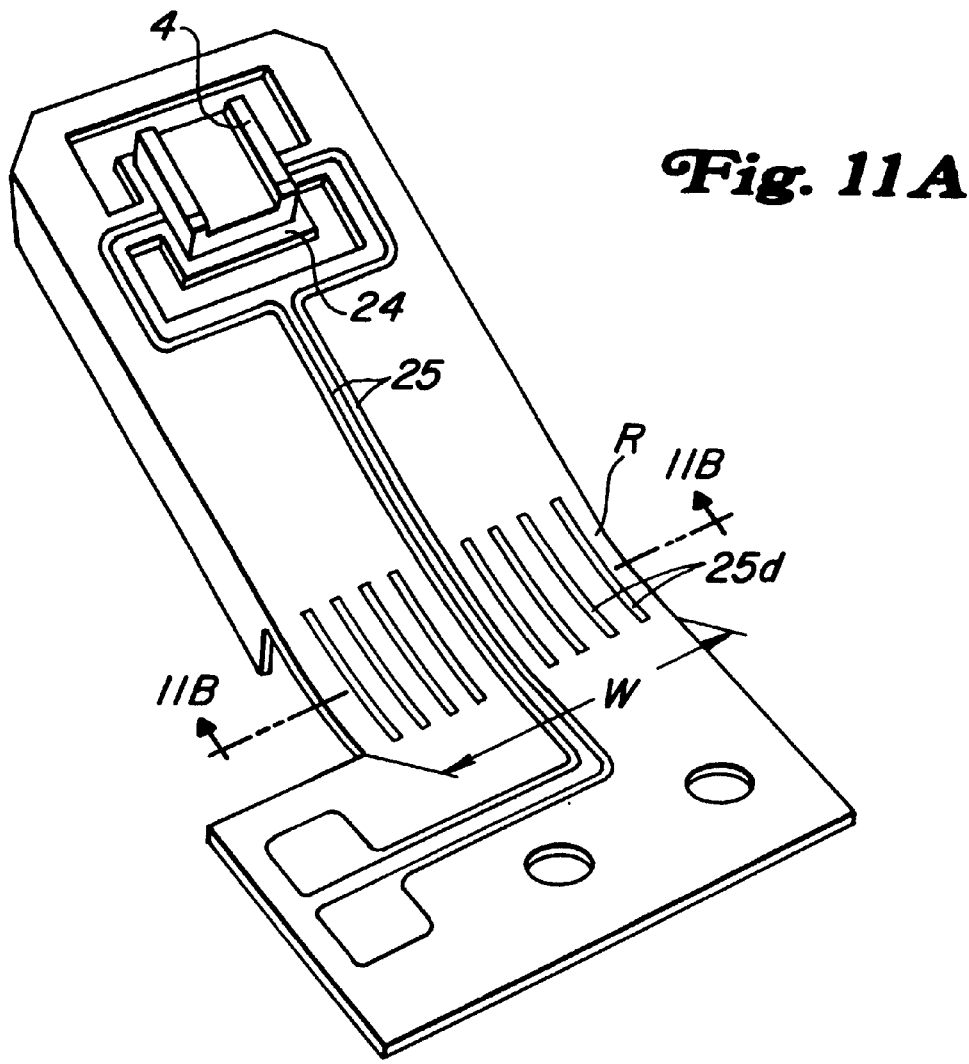
FIG. 11A is a perspective view of a fifth embodiment of a magnetic head assembly according to the present invention.
Figure 11B:
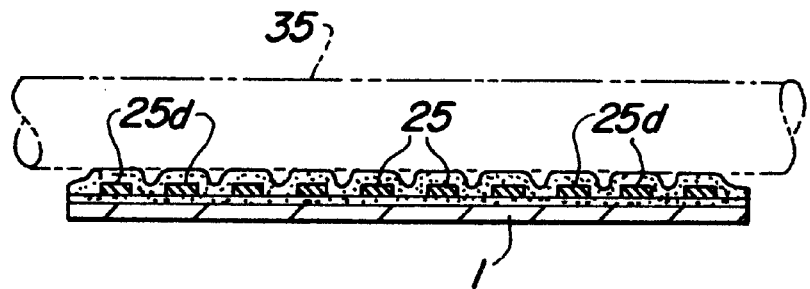
FIG. 11B is an enlarged partial cross sectional view taken along a line 11B—11B of FIG. 11A.

A description will now be given, with reference to FIGS. 11A and 11B, of a fifth embodiment of the present invention. FIG. 11A is a perspective view of a fourth embodiment of a magnetic head suspension unit according to the present invention; FIG. 11B is an enlarged partial cross sectional view taken along a line 11B—11B of FIG. 11A.

In the present embodiment, a plurality of dummy patterns 25d are formed within the elastic portion R. The dummy patterns 25d have the same construction as the conductive-pattern layers 25. When the elastic portion R is pressed by the roller 35 as shown in FIG. 11B, the pressing force is dispersed onto the dummy patterns 25d, and thus damage and breakage of the conductive-pattern layers 25 is prevented unlike in the case of the conventional conductive-pattern layers in which the pressing force is concentrated onto the conductive-pattern layers.

Figure 12A:
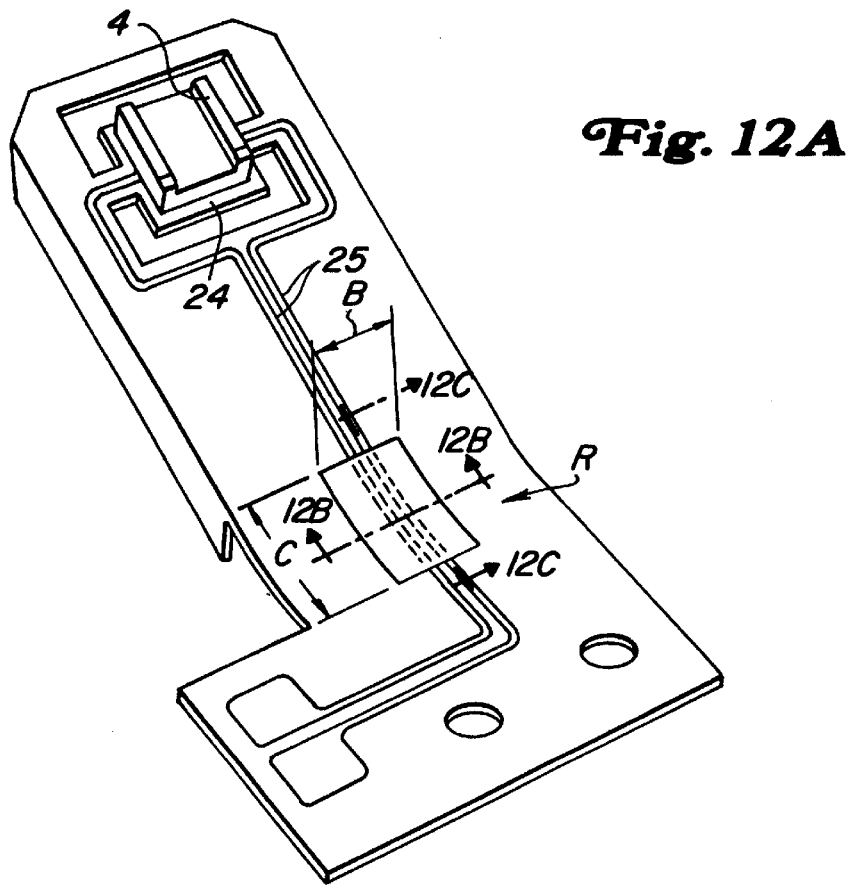
FIG. 12A is a perspective view of a sixth embodiment of a magnetic head assembly according to the preset invention.
Figure 12B:
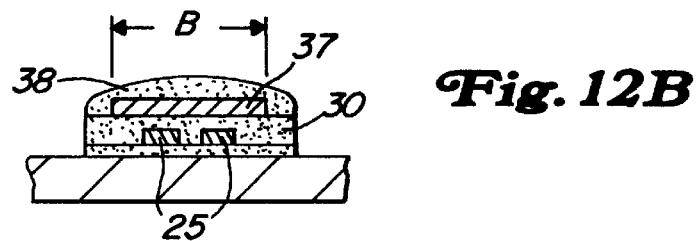
FIG. 12B is an enlarged partial cross sectional view taken along a line 12B—12B of FIG. 12A.
Figure 12C:
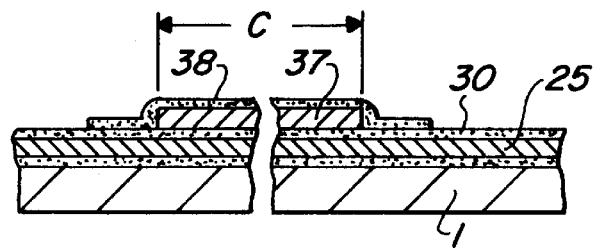
FIG. 12C is an enlarged partial cross sectional view taken along a line 12C—12C of FIG. 12C.

FIG. 12A is a perspective view of a sixth embodiment of a magnetic head suspension unit according to the present invention; FIG. 12B is an enlarged partial cross sectional view taken along a line 12B—12B of FIG. 12A; FIG. 12C is an enlarged partial cross sectional view taken along a line 12C—12C of FIG. 12C. In the sixth embodiment, a protecting layer is formed over portions of the conductive-pattern layers 25 in the elastic portion R. The protecting layer comprises a conducting layer 37 and an insulating layer 38.

In order to make the present embodiment, a copper base layer is formed on the insulating layer 30 in the process shown in FIG. 6B-3-6. The conductive layer 37 made of copper is then formed by means of electro plating, and the layer 37 is patterned. Polyimide resin is coated over the conductive layer 37 so as to form the insulating layer 38. Preferably, the insulating layer 30 formed over the conductive-pattern layers 25 is formed with a relatively great thickness so that the insulating layer 30 can be flattened and smoothed by means of surface polishing. The conductive layer 37 has a relatively large width B to cover the conductive-pattern layers 25, and has a length C which covers the length of the elastic portion R as shown in FIG. 12A.

In the present embodiment, the roller 35 exerts a pressing force onto the conductive layer 37 which has a relatively high strength, and thus the pressing force is uniformly dispersed onto the conductive layer 37. Accordingly, damage to the conductive-pattern layers 25 is prevented when the spring arm 1 is bent by the roller 35.

Figure 13B:
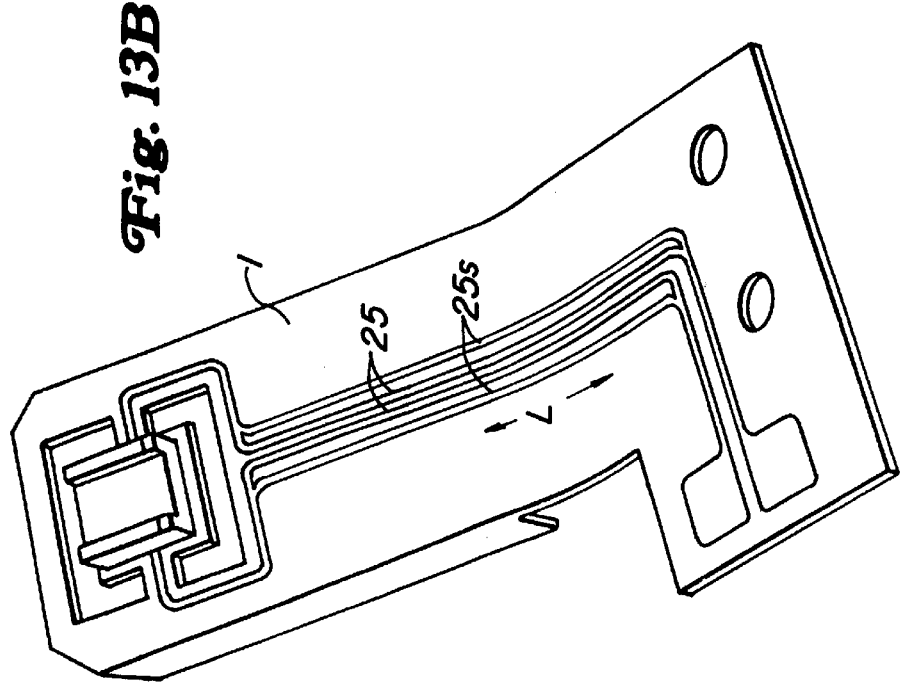
FIG. 13B is a variation of the embodiment shown in FIG. 13A.
Figure 13A:
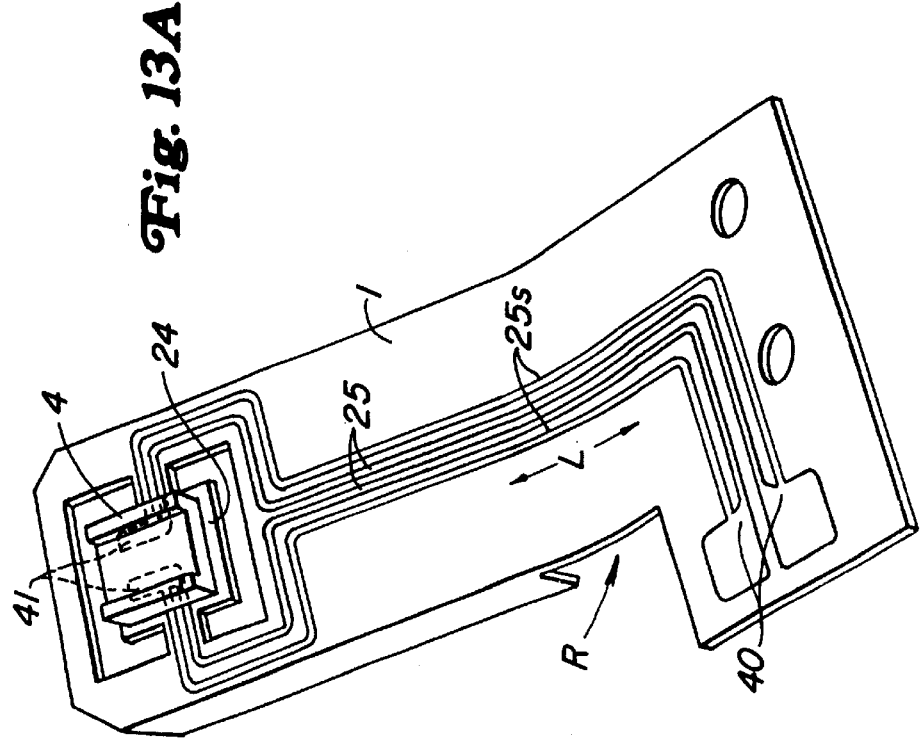
FIG. 13A is a perspective view of a seventh embodiment of a magnetic head assembly according to the present invention.

FIG. 13A is a perspective view of a seventh embodiment of a magnetic head suspension unit according to the present invention. In the seventh embodiment, extra conductive-pattern layers 25s are formed. The extra conductive-pattern layers 25s are formed along each of the conductive layers 25. Both ends of each of the additional conductive-pattern layers 25s are connected to the ends of the respective conductive-pattern layers 25 at corresponding connection parts 40 and 41. Accordingly, if one of the conductive-pattern layers 25 is damaged to lose continuity, the corresponding extra conductive-pattern layer 25s serves the same function as the damaged conductive-pattern layer 25. Therefore, a reliable connection can be realized.

FIG. 13B is a variation of the seventh embodiment according to the present invention. In this variation, each of the conductive-pattern layers 25 has two paths along the straight portion thereof within the elastic portion R. One of the paths serves as the extra conductive-pattern layer 25s.

In all the above-mentioned embodiments and variations thereof, although the bent portions are formed by a press method using a roller, other method using a mold press or laser may be used.

Since the spring arm 1 according to the above-mentioned embodiments is mounted on a member of the magnetic head positioning mechanism, as shown in FIG. 2, the magnetic disk drive can reliably transmit recording/reproducing signals through the spring arm.

Figure 14:
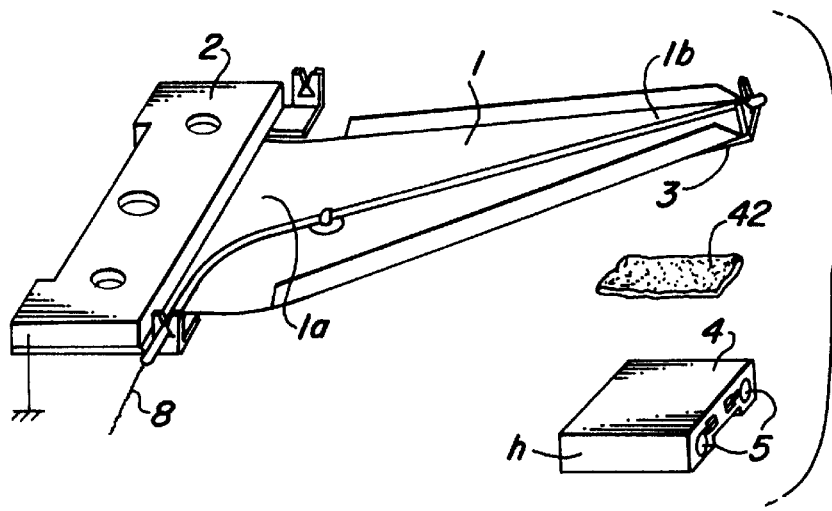
FIG. 14 is a perspective view of an eighth embodiment of a magnetic head assembly according to the present invention.
Figure 15A:
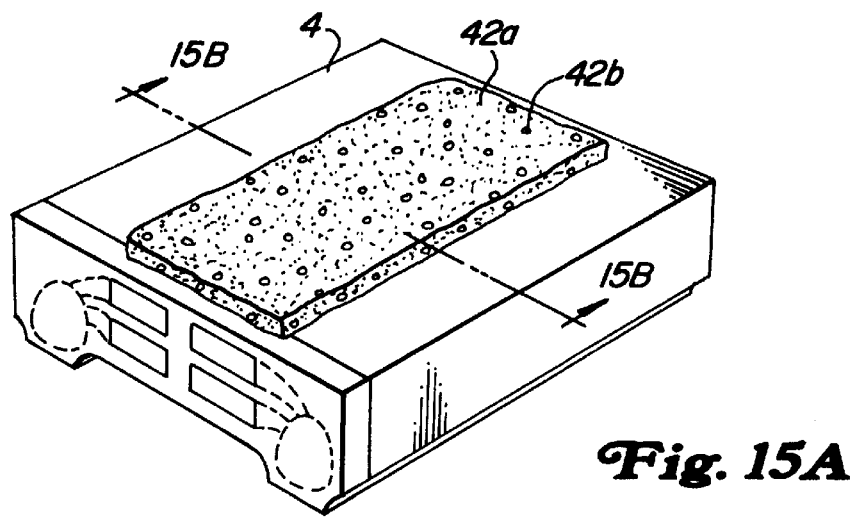
FIG. 15A is a perspective view of the magnetic head shown in FIG. 14.
Figure 15B:
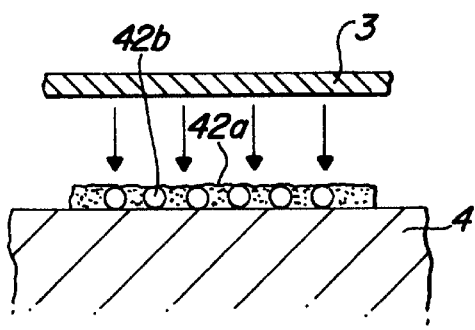
FIG. 15B is a cross sectional view taken along a line 15B—15B of FIG. 15A.

A description will now be given, with reference to FIG. 14 and FIGS. 15A and 15B, of an eighth embodiment according to the present invention. FIG. 14 is a perspective view of the eighth embodiment of a magnetic head suspension unit according to the present invention. In FIG. 14, parts that are the same as the parts shown in FIG. 1A are given the same reference numerals, and descriptions thereof will be omitted. FIG. 15A is a perspective view of the magnetic head h shown in FIG. 14; FIG. 15B is a cross sectional view taken along a line 15B—15B of FIG. 15A.

In the eighth embodiment according to the present invention, the core slider 4 is mounted on the gimbal 3 by adhesive 42 having a high insulating effect. The core slider 4 may instead be directly mounted on the end 1b of the spring arm 1. Although, in the prior art, the core slider is also mounted by adhesive having an insulating effect, the electric resistance between the core slider 4 and the gimbal 3 is low because the adhesive layer is very thin. Accordingly, the core slider 4 may be at the same potential, that is a ground potential, as the spring arm 1 because the spring arm 1 is grounded. If a high voltage static electricity is generated in the thin-film coil of the magnetic head element 5, the insulating layer between the thin-film coil and the magnetic pole is damaged, resulting in electric discharge between the thin-film coil and the core slider.

In the eighth embodiment, in order to obtain a high resistance between the core slider and the gimbal 3, a thick layer of the adhesive 42 is provided. It is preferable that the adhesive 42 be a UV cure resin (ultra-violet cure type adhesive). Alternatively, epoxy resin may be used. In the present embodiment, as shown in FIG. 15A, the adhesive 42 comprises an insulating material powder 42b mixed in adhesive medium 42a. Accordingly, the adhesive 42 can have a high electric resistance, and is formed with a relatively great thickness, and thus the insulation between the core slider 4 and the gimbal 3 is improved.

Figure 16:
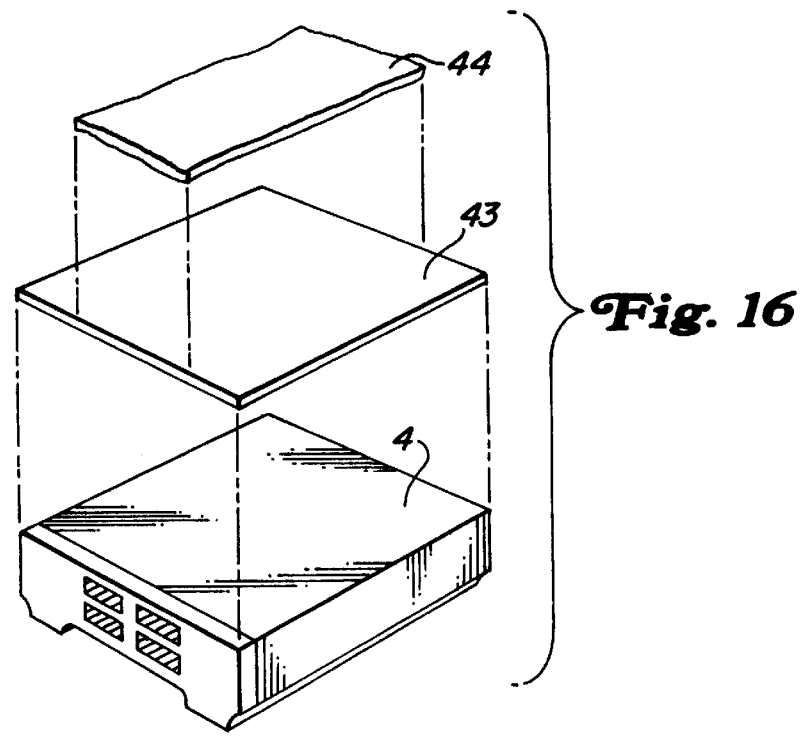
FIG. 16 is an exploded view of an essential part of a ninth embodiment of a magnetic head assembly according to the present invention.
Figure 17:
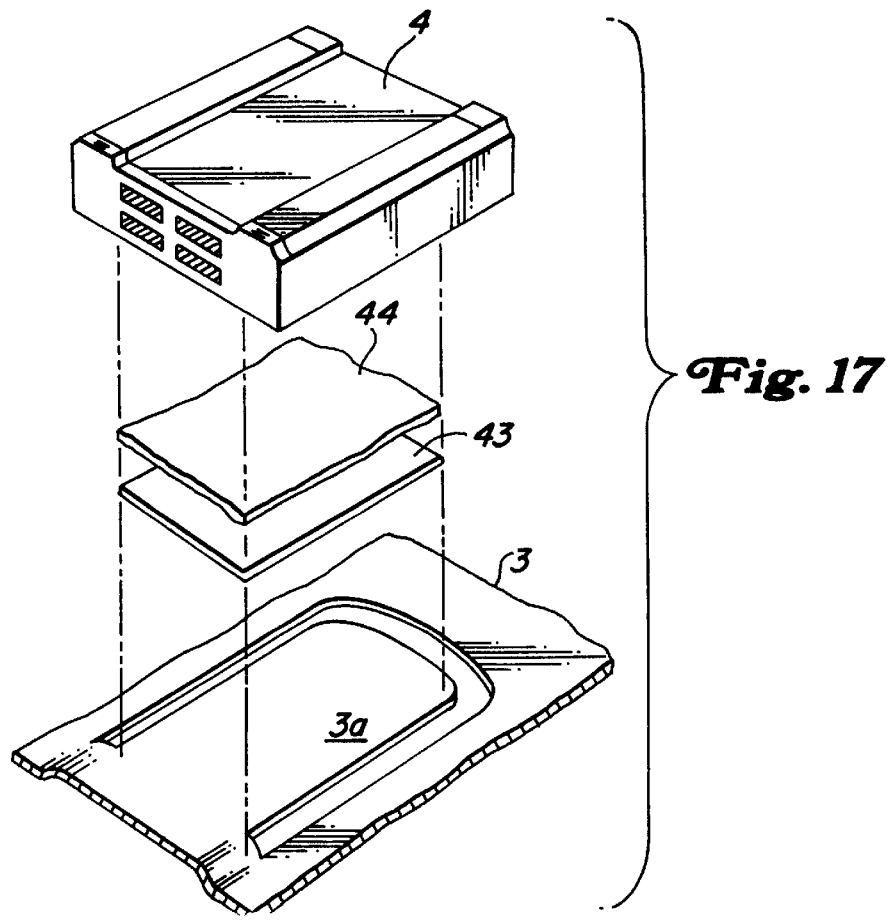
FIG. 17 is an exploded view of an essential part of a variation of the ninth embodiment shown in FIG. 16.

FIG. 16 is an exploded view of an essential part of a ninth embodiment of a magnetic head suspension unit according to the present invention. In the ninth embodiment, the core slider 4 is mounted on the gimbal 3 or the end 1b of the spring arm 1 via an insulator 43. In the present embodiment, the insulator 43 is formed by applying insulating resin such as a photoresist onto a surface of the core slider 4. The core slider is mounted on the gimbal 3 by applying adhesive 44 onto the insulator 43. Alternatively, as shown in FIG. 17, the insulator 43 may be applied onto a mounting surface of the gimbal 3.

FIG. 18 is a perspective view of an essential part of a tenth embodiment according to the present invention. In FIG. 18, a magnetic head comprising the magnetic head elements 5 and a core slider 4i is shown. Unlike the conventional magnetic head, the core slider 4i is made of an insulating material such as $SiO_2$. Accordingly, the discharge as described in relation to the conventional magnetic head can be eliminated.

FIG. 19 is an exploded view of an eleventh embodiment of a magnetic head suspension unit according to the present invention. In the present embodiment, the magnetic head suspension unit is mounted on a driving arm 13 of the magnetic head driving mechanism via an insulating member 45. The insulating member has screw holes 46 into which screws for fastening the magnetic head suspension unit to the driving arm 13 are inserted. The screws are made of synthetic resin or metal screws covered with synthetic resin. Accordingly, the spring arm 1 is insulated from the driving arm 13, which may be grounded. Alternatively, the spacer 2 may be made of an insulating material.

In the present embodiment, since the spring arm is not electrically connected to the driving arm 13, which may be grounded, no electric discharge occurs between the core slider 4 and the magnetic pole.

FIG. 20A is a perspective view of a spring arm of a twelfth embodiment of a magnetic head suspension unit according to the present invention; FIG. 20B is an enlarged cross sectional view showing a mounting structure of the core slider shown in FIG. 20A. In the present embodiment, a gimbal 24 formed on the spring arm 1 has a hole 47 in the center thereof. As shown in FIG. 20B, the core slider 4 is mounted on the gimbal 24 by adhesive 48 so that the hole 47 is filled with the adhesive 48. Since the hole is formed in the gimbal 24, the gimbal can be easily bent, if bending stress is applied to the gimbal 24 due to a difference in thermal expansion between the core slider and the gimbal 24. Accordingly, bending stress applied to the core slider 4 is reduced since the gimbal 24 is bent instead of the core slider 4. This feature is important when a thin and miniaturized core slider is used.

Variations of the hole 47 are shown in FIGS. 21A through 21F. A plurality of holes 47 may be provided, and each hole may have a rectangular shape.

In the present embodiment, the hole 47 is filled with a part of the adhesive applied between the core slider 4 and the gimbal 24, so that the strength of the adhesion between the core slider 4 and the gimbal 24 is increased. Additionally, if the UV cure resin is used, an ultra-violet beam can be irradiated through the hole 47, which effectively cures the UV cure resin, and thus the strength of the cured UV cure resin can be improved.

Figure 1B:
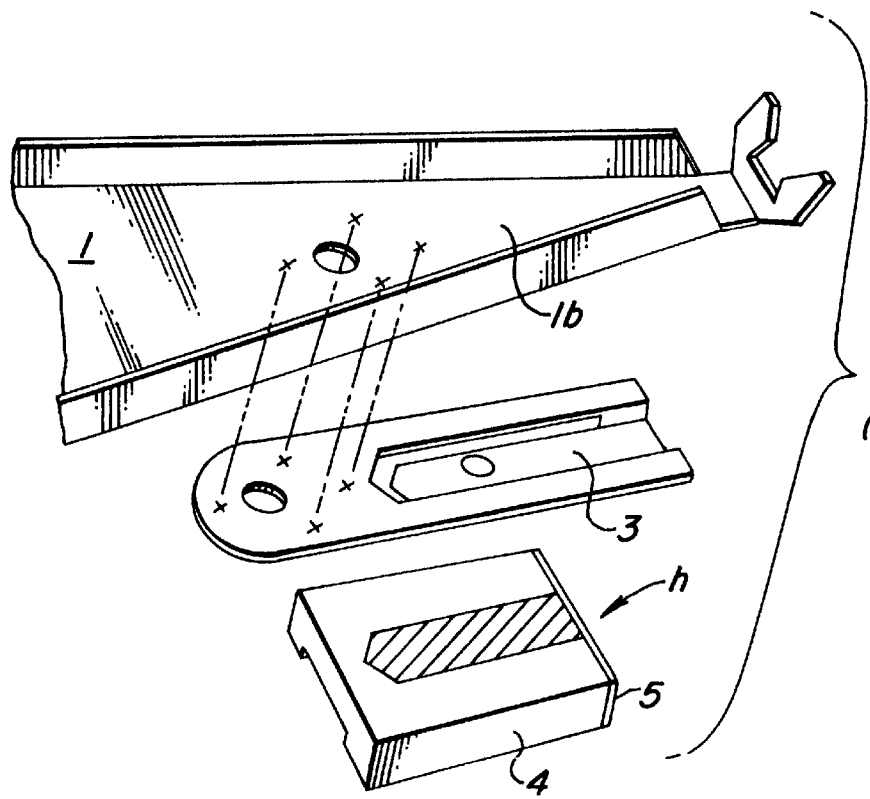
FIG. 1B is an exploded view of a part of the magnetic head assembly shown in FIG. 1A.

It should be noted that although the gimbal 24 is integrally formed with the spring arm 1, the gimbal 24 may be formed separately from the spring arm 1; that is, it may be fixed to the spring arm 1 by means of welding described in regard to the conventional magnetic head suspension unit shown in FIG. 1B.

Figure 22A:
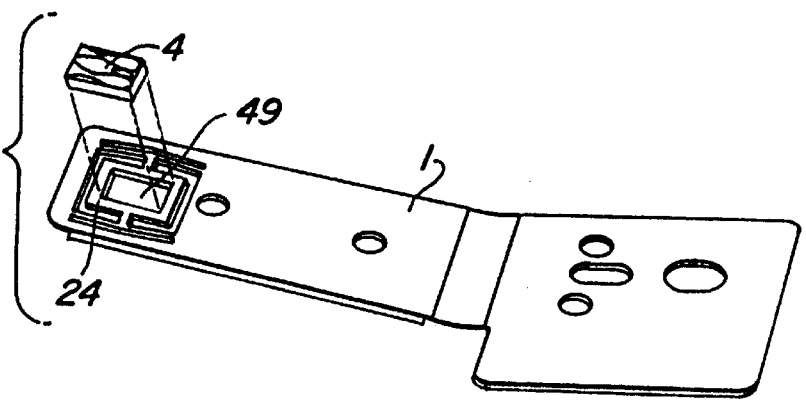
FIG. 22A is a perspective view of a spring arm of a thirteenth embodiment of a magnetic head assembly according to the present invention.
Figure 22B:
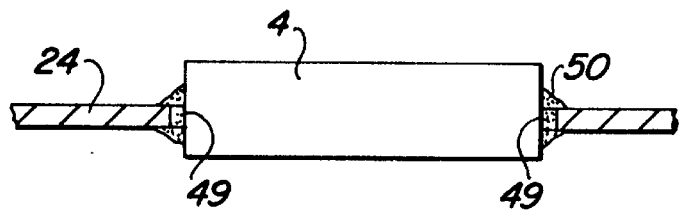
FIG. 22B is an enlarged cross sectional view of a mounting structure of the core slider shown in FIG. 22A.
Figure 22C:
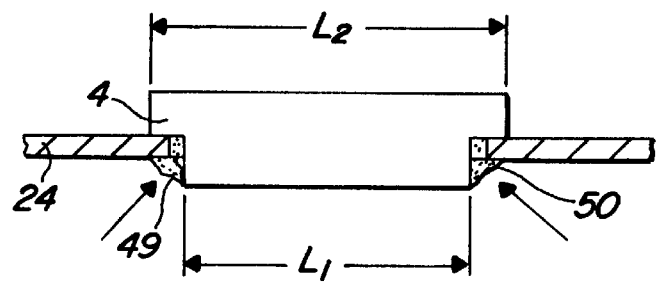
FIG. 22C is an enlarged cross sectional view showing a variation of the mounting structure shown in FIG. 22B.

FIG. 22A is a perspective view of a spring arm of a thirteenth embodiment of a magnetic head suspension unit according to the present invention; FIG. 22B is an enlarged cross sectional view of a mounting structure of the core slider shown in FIG. 22A; FIG. 22C is an enlarged cross sectional view showing a variation of the mounting structure shown in FIG. 22B. In the present embodiment, an opening 49 is provided in the gimbal 24, into which opening the core slider is inserted. The opening 49 is slightly larger than the outer dimension of the core slider 4.

The core slider 4 is mounted in a state where side faces of the slider core 4 are fixed, as shown in FIG. 22B, by adhesive 50 to the outer edge of the opening 49. Alternatively, as shown in FIG. 22C, the core slider 4 may be formed to have a step in its side surface so that dimension $L_2$ is larger than dimension $L_1$. The dimension of the opening is determined to be a value between $L_1$ and $L_2$. The adhesive such as UV cure resin is applied to the outer edge of the opening after the core slider 4 is inserted into the opening 49. An ultra-violet beam is then irradiated from a direction indicated by an arrow in FIG. 22C so as to cure the UV cure resin.

In the present embodiment, since the core slider 4 is supported at the side surfaces thereof, stress generated by thermal expansion of the gimbal 24 is lessened. Accordingly, deformation of the core slider 4 due to the thermal expansion of the gimbal can be efficiently prevented.

It should be noted that the magnetic heads shown in FIGS. 20A and 22A are formed with an MR element formed by means of thin-film technology. Thin-film type magnetic head elements are formed on the MR element. However, the present invention is not limited to the specific magnetic head, and a conventional thin-film type magnetic head or a monolithic type magnetic head may be used.

A description will now be given, with reference to FIG. 23, of a magnetic head suspension unit 120 according to a fourteenth embodiment of the present invention.

Figure 24:
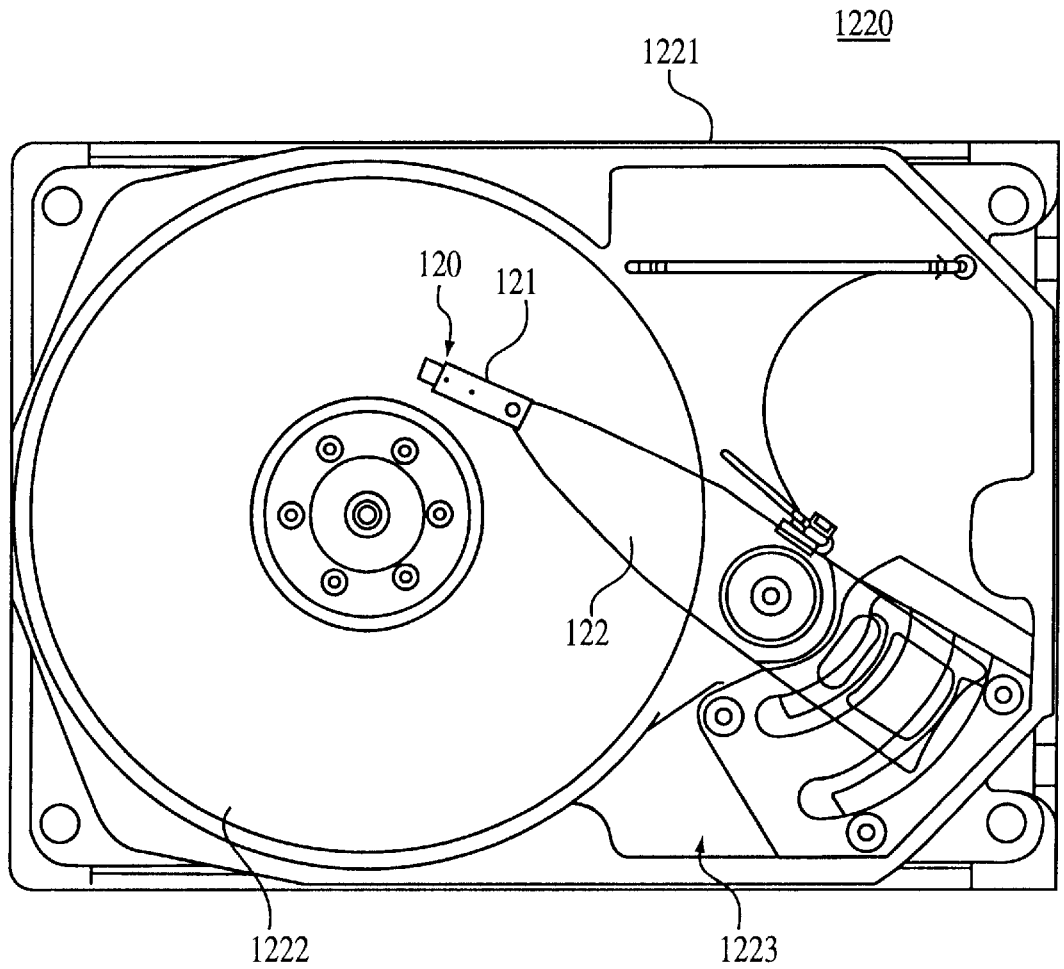
FIG. 24 is a plan view of a 3.5-inch magnetic disk drive to which the magnetic head assembly shown in FIG. 23 is applied.

FIG. 24 shows a 3.5-inch type magnetic disk drive 1220 to which the magnetic head suspension unit 120 is applied. The magnetic disk drive 1220 has an enclosure 1221 in which a 3.5-inch magnetic disk 1222, a head positioning actuator 1223 and other parts are housed.

A suspension (load beam) 121 made of stainless steel is fixed to an arm 122 of the actuator 223. The suspension 121 has a curved bent portion 123 generating elasticity. In this regard, the curved portion 123 of the suspension 121 is also referred to as an elastic portion 123 in the following description. The suspension 121 has a stiffness portion 124 extending from the elastic portion 123, and ribs 121a. The elastic portion 123 provides a magnetic head slider (core slider) 135 with a load in a direction in which the magnetic head slider 135 moves and comes into contact with a magnetic disk 1222. The suspension 121 has a uniform thickness of, for example, approximately 25 μm, which is equal to one-third of the thickness of a suspension of a 3380-type (IBM) head suspension unit.

It is desirable that the width W1 of the suspension 121 is made as small as possible, desirably 4 mm or less. This is because the resonance frequency of vibration of the suspension 121 is prevented from lowering.

A gimbal 125 is integrally formed in the suspension 121 so that the suspension 121 and the gimbal has a one-piece construction which uses a plate. The gimbal 125 includes a pair of C-shaped openings 126 and 126 facing each other in the longitudinal direction of the suspension 121. Two slits 128 and 129 are formed in the suspension 121 along respective sides of the suspension 121.

The gimbal 125 includes a magnetic slider fixing portion 130, a first pair of beam portions 131 and 132, and a second pair of beam portions 133 and 134. The magnetic head slider fixing portion 130 has large surface dimensions enough to fix the magnetic head slider 135 thereon, and has the same dimensions as the magnetic head slider 135 (a=1.6 mm, b=2.0 mm). However, it is possible for the slider fixing portion 130 to have an area less than the magnetic head slider 135 when a sufficient adhesive strength can be obtained.

The magnetic head slider 135 is a light weight structure type slider, which has been proposed in Japanese Patent Laid-Open Application No. 4-228157. The proposed slider has a flat back surface opposite to a disk facing surface. The flat back surface of the slider is fixed to the fixing portion 130 by means of an adhesive, which can be an insulation adhesive or an adhesive including an insulator (for example, insulator power). In this case, the slider 135 is located so that the center thereof corresponds to the center of the fixing portion 130. It is also possible to use other types of sliders.

The beam portions 131 and 132 extend outwardly from the respective sides of the fixing portion 130 along a line (suspension width direction line) 138, which passes through the center of the fixing portion 130 (the above center is also the center of the slider 135), and crosses a longitudinal center line 137 of the suspension 121 at a right angle. Each of the beam portions 131 and 132 has a length $l_1$.

The beam portion 133 extends from the beam portion 131 towards the respective sides of the beam portion 131 so that the beam portion 133 crosses the beam portion 131 at a right angle and extends parallel to the line 137. Similarly, the beam portion 134 extends from the beam portion 132 towards the respective sides of the beam portion 132 so that the beam portion 134 crosses the beam portion 132 at a right angle and extends in parallel with the line 137. The beam portion 133 is joined to portions 140 and 141 of the suspension 121 in the periphery of the gimbal 125. Similarly, the beam portion 134 is joined to portions 142 and 143 of the suspension 121 in the periphery of the gimbal 125. In other words, the beam portion 133 extends from the portions 140 and 141 of the gimbal 125, and the beam portion 134 extends from the portions 142 and 143 of the gimbal 125. The distance between the center of the beam portion 133 and one of the two ends thereof is $l_2$. Similarly, the distance between the center of the beam portion 134 and one of the two ends thereof is also $l_2$.

The beam portion 133 and the beam portion 131 form a T-shaped beam 139A. Similarly, the beam portion 134 and the beam portion 132 form a T-shaped beam 139B. The beam portions 131, 132, 133 and 134 form an H-shaped beam. It will be noted that the fixing portion 130, the first pair of beams 131 and 132, and the second pair of beams 133 and 134 are portions of the suspension 121.

The length $l_1$ of the first pair of beams 131 and 132 is limited by the width W1 of the suspension 121. As the width W1 of the suspension 121 is increased, the resonance frequency of a bend and twist of the suspension 121 becomes lower, and the flying characteristics of the slider 135 are degraded. For these reasons, the width W1 cannot be increased. However, according to the fourteenth embodiment of the present invention, it is possible to increase the length $l_2$ of the second pair of beams 133 and 134 without being limited by the width W1 of the suspension 121. The second pair of beams 133 and 134 is formed so that $l_2 > l_1$. That is, each of the T-shaped beams 39A and 39B has a leg portion and an arm portion longer than the leg portion.

When a waviness of the magnetic disk being rotated is present or dust adheres to the magnetic disk, the magnetic head slider 135 is rotated in a pitching direction indicated by an arrow 144 in a state in which the first pair of beams 131 and 132 and the second pair of beams 133 and 134 are bent. At this time, a twist deformation occurs in the first pair of beams 131 and 132 of the gimbal 125, and a bend deformation occurs in the second pair of beams 133 and 134.

As indicated by an arrow 145, the magnetic head slider 135 is rotated in a rolling direction also. At this time, bend deformations occur in the beams 131 and 132 in the respective directions opposite to each other, and bend deformations occur in the beams 133 and 134 in the respective directions opposite to each other.

Figure 25:
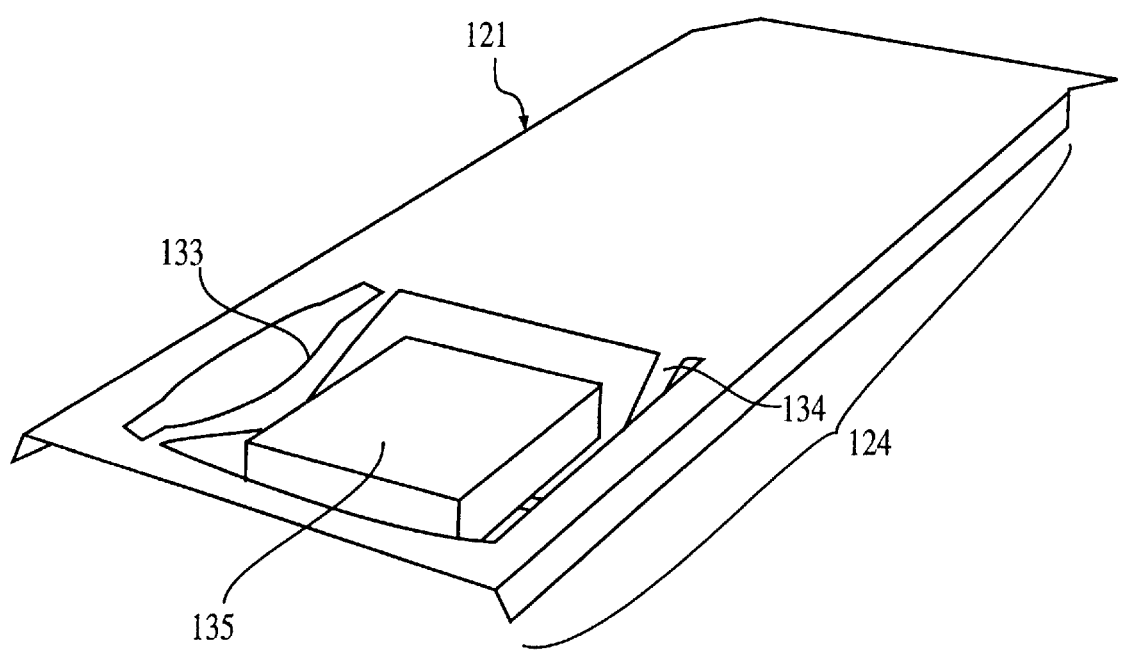
FIG. 25 is a perspective view of a first-order bend state of a suspension shown in FIG. 23.

FIG. 25 shows a resonance mode of the first-order bend. A deformation occurs in the elastic portion 123 formed at the root of the suspension 121, and the first pair of beams 131 and 132 and the second pair of beams 133 and 134 are deformed in the same direction.

Figure 26:
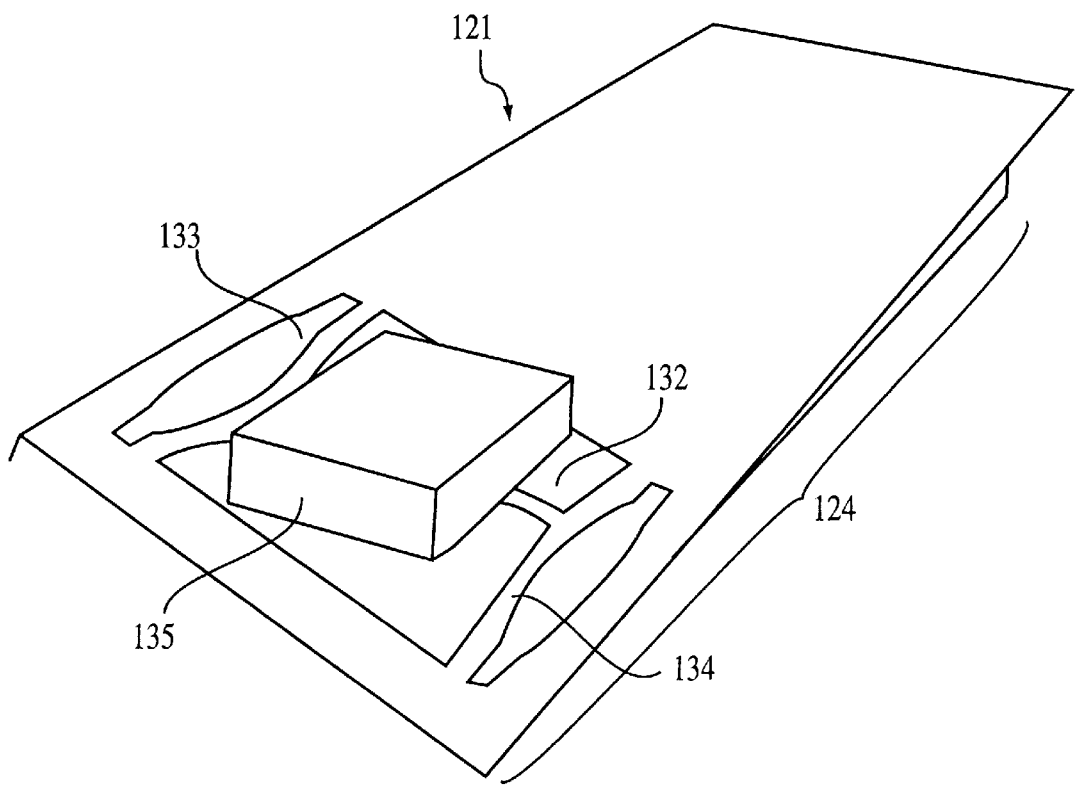
FIG. 26 is a perspective view of a first-order twist state of the suspension shown in FIG. 23.

FIG. 26 shows a resonance mode of the first-order twist. A twist deformation occurs in the elastic portion 123 formed at the root of the suspension 121 in such a manner so the right and left portions of the elastic portion 123 have different heights. The beam located on the right side of the gimbal 125 is deformed so as to be formed into a convex shape facing upwards. The beam located on the left side of the gimbal 125 is deformed so as to be shaped into a convex facing downwards. When the lengths $l_1$ and $l_2$ are selected so that the length $l_2$ is equal to three or four times the length $l_1$, the rotation stiffness responses of the slider in the pitching and rolling directions become sufficiently soft and are almost the same as each other.

Figure 23:
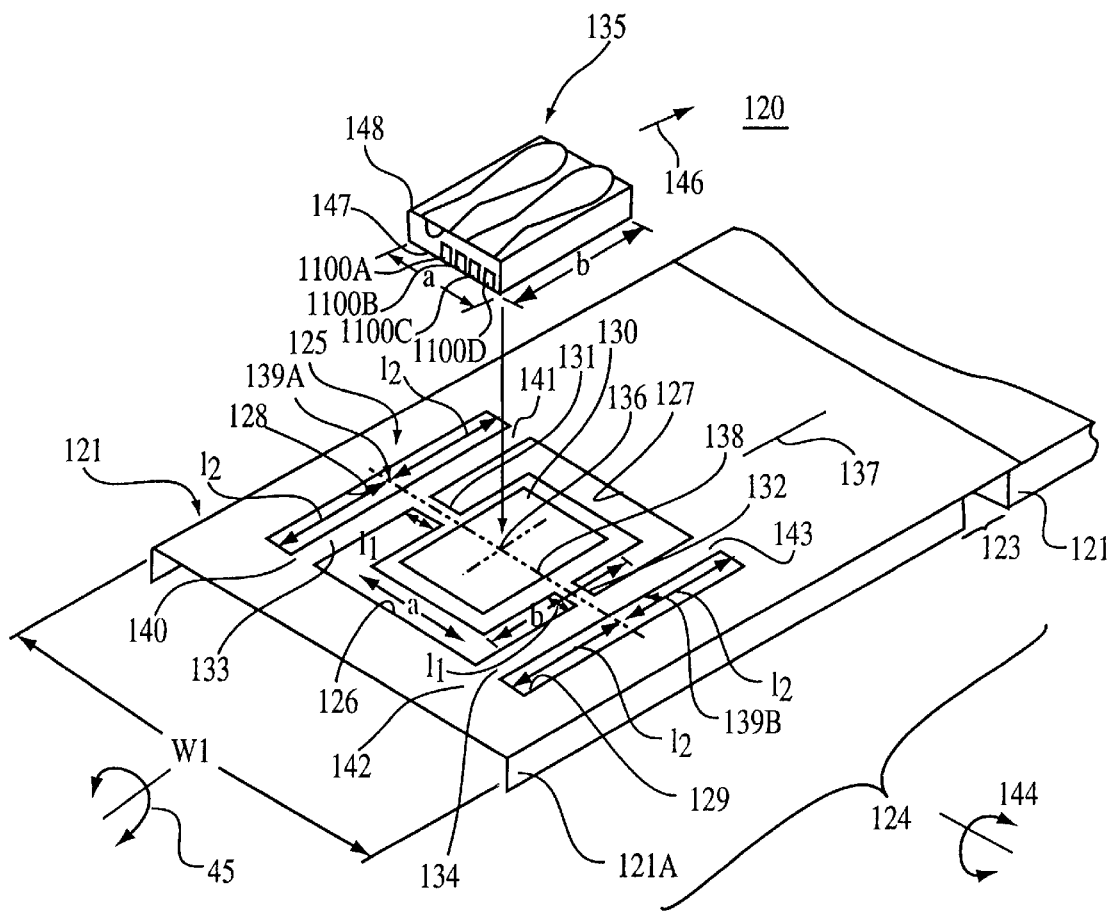
FIG. 23 is a perspective view of a magnetic head assembly according to a fourteenth embodiment of the present invention.

As shown in FIG. 23, a composite type magnetic head 148 and four terminals 1100A, 1100B, 1100C and 1100D are provided in the magnetic head slider 135. The magnetic head 148 includes an MR head for reproduction and an interactive type head for recording, these heads being integrated with each other. The magnetic head 148 is located at a rear end surface of the magnetic head slider 135 in a relative movement direction 146 with respect to the magnetic disk 1222.

Figure 27:
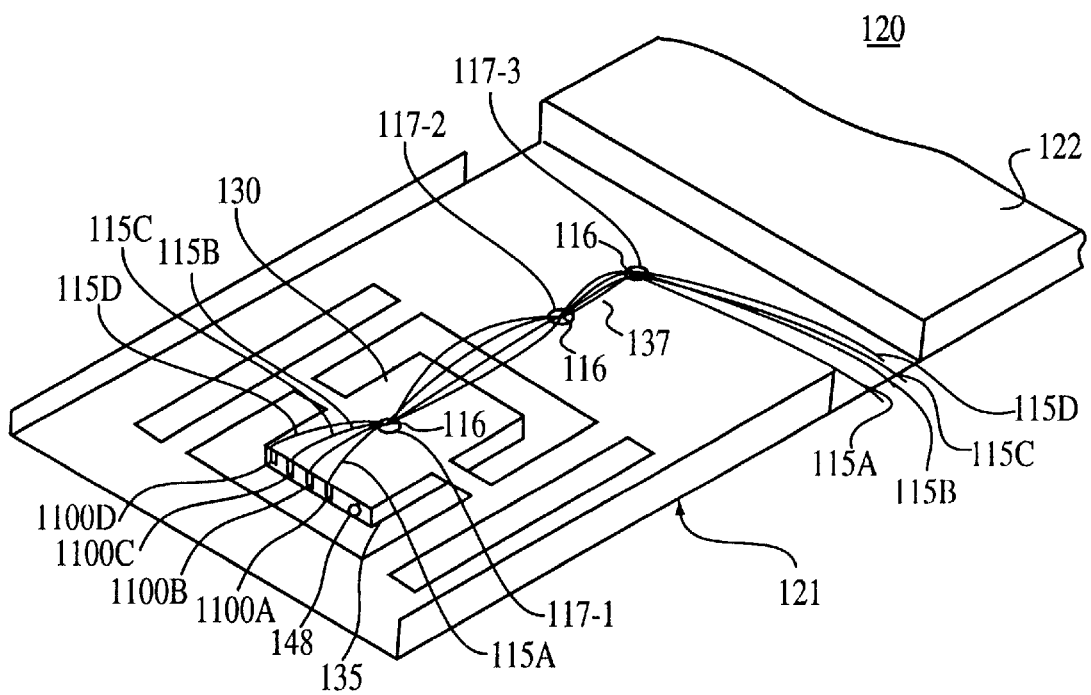
FIG. 27 is a perspective view of the upper side of the magnetic head assembly shown in FIG. 23.
Figure 28:
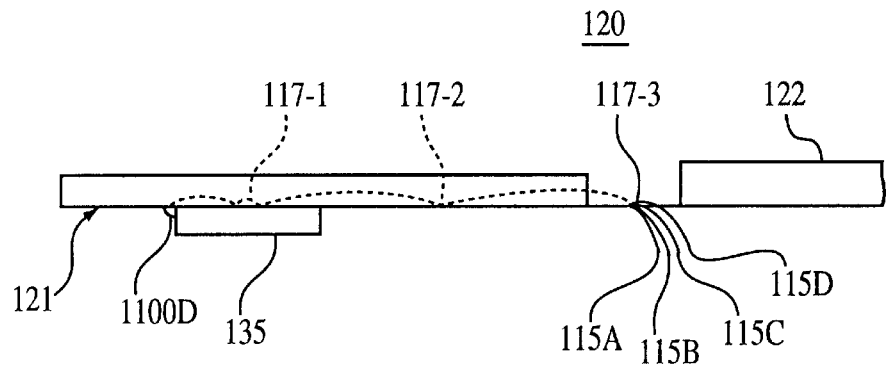
FIG. 28 is a side view of the magnetic head assembly shown in FIG. 23.

As shown in FIGS. 27 and 28, lead wires 115A, 115B, 115C and 115D are connected to the terminals 1100A, 1100B, 1100C and 1100D, respectively. Each of the lead wires 115A through 115D has a diameter of, for example, 30 $\mu$m. The lead wires 115A–115D are laid on the side opposite to the side on which the magnetic head slider 135 is mounted, and are attached to a center portion 36 of the fixing portion 130 by means of an adhesive 116, which can be an insulation adhesive or an insulator containing an insulator. Further, the lead wires 115A–115D extend along the longitudinal center line 137 of the suspension 121 towards the base portion of the suspension 121, and are fixed thereto at two points by means of the adhesive 116.

Reference numbers $117_{-1}$, $117_{-2}$ and $117_{-3}$ respectively indicate a first fixing point, a second fixing point and a third fixing point at which the lead wires 115A through 115D are fixed by means of the adhesive 116. The first fixing point $117_{-1}$ moves in accordance with movement of the magnetic head slider 135. Hence, it is unnecessary to be concerned about the stiffness of portions of lead wires 115A through 115D between the terminals 1100A–1100D and the first fixing point $117_{-1}$ and to provide additional lengths of the lead wires 115A–115D. In FIG. 27, such additional lengths of the lead wires 115A–115D are not provided. The distance between the first fixing point $117_{-1}$ and the second fixing point $117_{-2}$ is long, and the stiffness of the lead wires 115A–115B between the fixing points $117_{-1}$ and $117_{-2}$ little affects the rotation stiffness of the gimbal 125.

The magnetic head suspension unit 120 has the following features. First, the rotation stiffness of the gimbal 125 is considerably small because of the characteristics of the T-shaped beams. Second, the gimbal 125 is supported at the four points 140–143, and hence, the resonance frequency of vibration of the gimbal 125 is high even when the second pair of beams 133 and 134 is long. Third, the end of the suspension 121 can be formed so that it has a small width W1, and hence the resonance frequency of vibration of the suspension 121 is high. Fourth, the flying stability of the magnetic head slider 135 is excellent due to the above first, second and third features. The fifth feature of the mechanism 120 is such that the first pair of beams 131 and 132 has a short length $l_1$ and is formed in the same plane. Hence, the first pair of beams 131 and 132 has a large strength with respect to force received in the contact start/stop operation, and a shear failure does not easily occur in the beams 131 and 132. The sixth feature of the mechanism 120 is such that the stiffness of the lead wires 115A–115D does not affect the rotation stiffness of the gimbal 125.

As has been described above, the gimbal 125 is formed so that a pair of T-shaped beams (which form an H-shaped beam) is provided with respect to the center of the gimbal 125, and hence a low rotation stiffness and a high resonance frequency are achieved. More specifically, the rotation stiffness of the mechanism 120 becomes one-third of that of the aforementioned IBM 3380 type head suspension unit, while the resonance frequency of the mechanism 120 is as high as that of the IBM 3380 type head suspension unit. As a result, it becomes possible to stably fly a compact slider having a low airbearing stiffness.

Tables 1 and 2 show characteristics of the head suspension unit 120 according to the fourteenth embodiment of the present invention supporting a 2 mm-length slider, and the IBM 3380 type head suspension unit supporting which a 3.2 mm-length slider.

TABLE 1

COMPARISON OF STIFFNESS
(static characteristics by computer simulation)

| Stiffness | 1st embodiment | 3380 type |
| --- | --- | --- |
| pitch stiffness | 1.5 grf cm/rad | 9.4 grf cm/rad |
| roll stiffness | 1.5 grf cm/rad | 5.1 grf cm/rad |
| up/down stiffness | 0.55 grf/mm | 2.4 grf/mm |
| equivalent weight ratio | 0.74 | 0.72 |

TABLE 2

COMPARISON OF RESONANCE FREQUENCY
(dynamic characteristic by computer simulation)

| Stiffness | 1st embodiment | 3380 type |
| --- | --- | --- |
| 1st bend | 2.1 kHz | 2.1 kHz |
| 1st twist | 2.3 kHz | 2.6 kHz |
| in-plane | 8.5 kHz | 5.7 kHz |

In order to make the equivalent weight ratio ((supporting spring equivalent weight)/(slider weight)) of the fourteenth embodiment equal to that of the IBM 3380 type mechanism, the total length of the suspension unit is short (10 mm), which is approximately half of that of the IBM 3380 type mechanism. Further, the thickness of the suspension 121 of the fourteenth embodiment is 25 $\mu$m, which is approximately one-third of that of the IBM 3380 type mechanism.

Table 1 shows data obtained by computer simulation. More specifically, Table 1 shows the pitch stiffness and roll stiffness of the gimbal 125 of the fourteenth embodiment, and the up/down stiffness of the suspension 121 thereof. Further, Table 1 shows the pitch stiffness and the roll stiffness of the gimbal of the IBM 3380 type mechanism, and the up/down stiffness of the suspension thereof. It can be seen from Table 1 that the rotation stiffness equal to one-third of the gimbal of the IBM 3380 type mechanism can be obtained by optimizing the width and length of the grooves in the gimbal 125.

Table 2 shows the resonance frequencies of the fourteenth embodiment and the conventional IBM 3380 type mechanism obtained by a computer simulation. The resonance frequencies of the fourteenth embodiment are similar to those of the IBM 3380 type mechanism.

As will be seen from the above, the magnetic head suspension unit according to the fourteenth embodiment of the present invention has a low stiffness and a high resonance frequency.

A description will now be given of a fifteenth embodiment of the present invention. In the following description, parts that are the same as those shown in FIG. 23 are given the same reference numbers.

Figure 29:
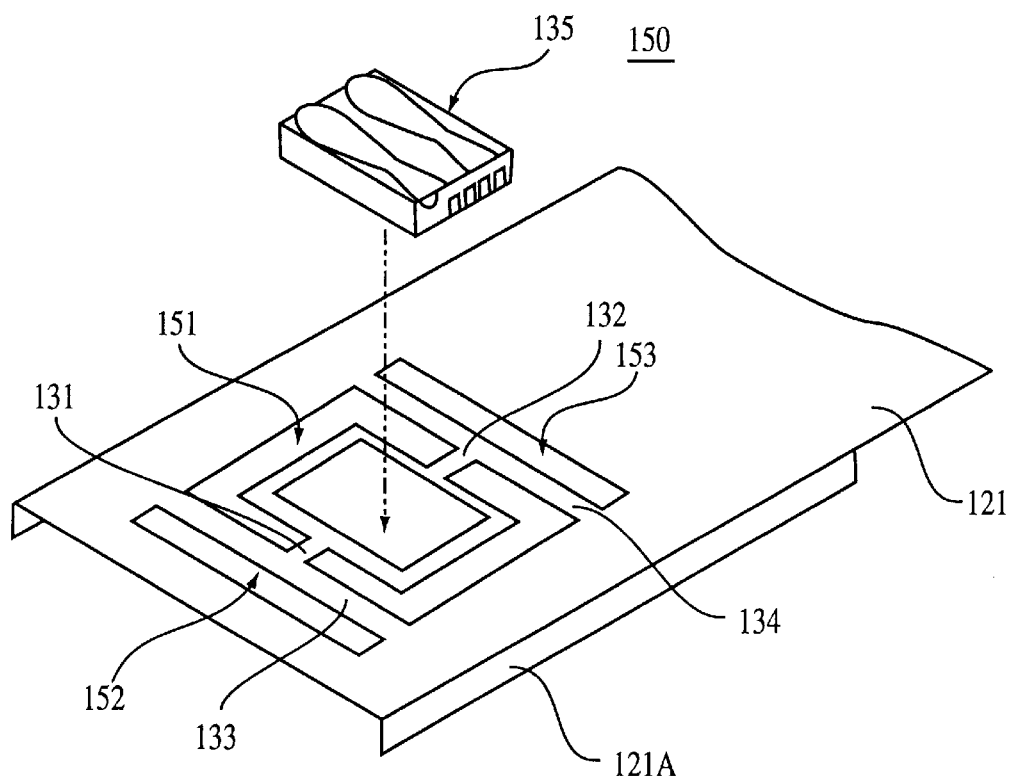
FIG. 29 is a perspective view of a magnetic head assembly according to a fifteenth embodiment of the present invention.

FIG. 29 shows a magnetic head suspension unit 150 according to the fifteenth embodiment of the present invention. The mechanism 150 includes a gimbal 151. The gimbal 151 is formed so that the gimbal 125 shown in FIG. 23 is rotated about the center 136 by 90°. Two T-shaped beams 152 and 153 are arranged in the longitudinal direction of the suspension 121.

Figure 30:
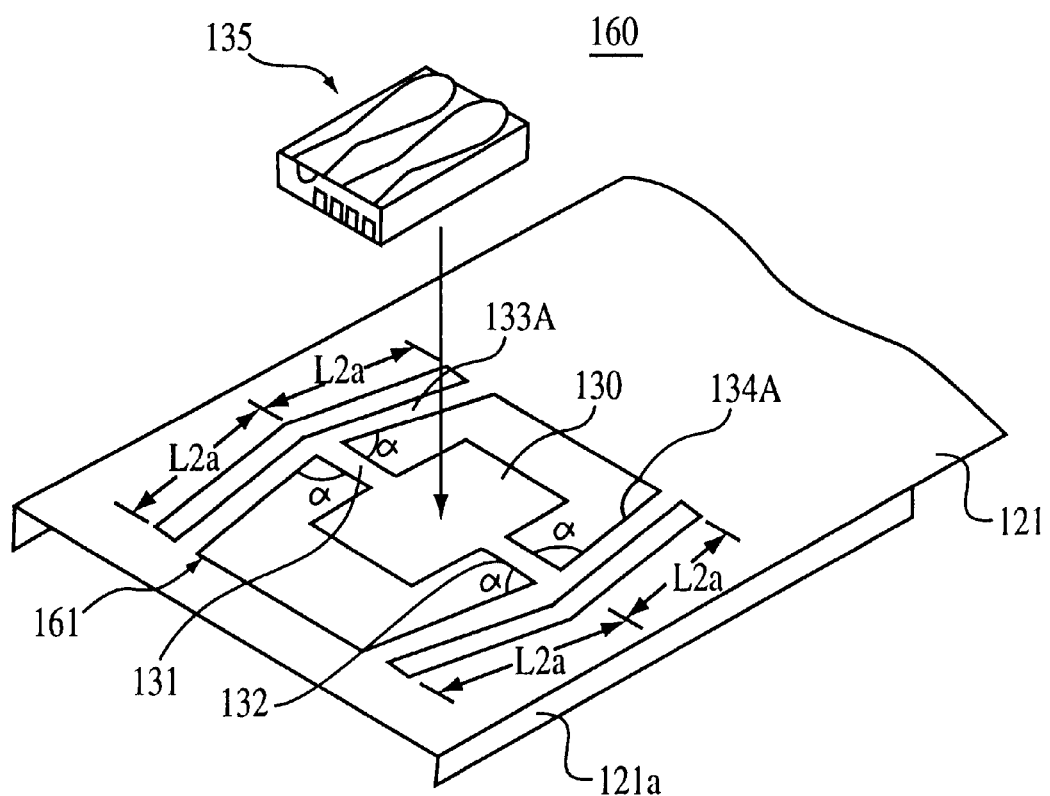
FIG. 30 is a perspective view of a magnetic head assembly according to a sixteenth embodiment of the present invention.

FIG. 30 shows a magnetic head suspension unit 160 having a gimbal 161 according to a sixteenth embodiment of the present invention. The gimbal 161 has the aforementioned first pair of beams 131 and 132, and a second pair of beams 33A and 34A. The beam 133A and the beam 131 form an acute angle α. Similarly, the beam 134A and the beam 132 form an acute angle equal to the acute angle α. With the above structure, it becomes possible to form, without increasing the width W1 of the suspension 121, the second pair of beams 133A and 134A so that the length $2 \times l_{2a}$ thereof is greater than the length $2 \times l_2$ of the second pair of beams 133 and 134 shown in FIG. 23. Further, it is possible to narrow the end of the suspension 121. Hence, the rotation stiffness of the gimbal 161 is less than that of the gimbal 125 shown in FIG. 123. Thus, the magnetic head slider 135 in the sixteenth embodiment can be more stably flied than that in the fourteenth embodiment shown in FIG. 23.

Figure 31:
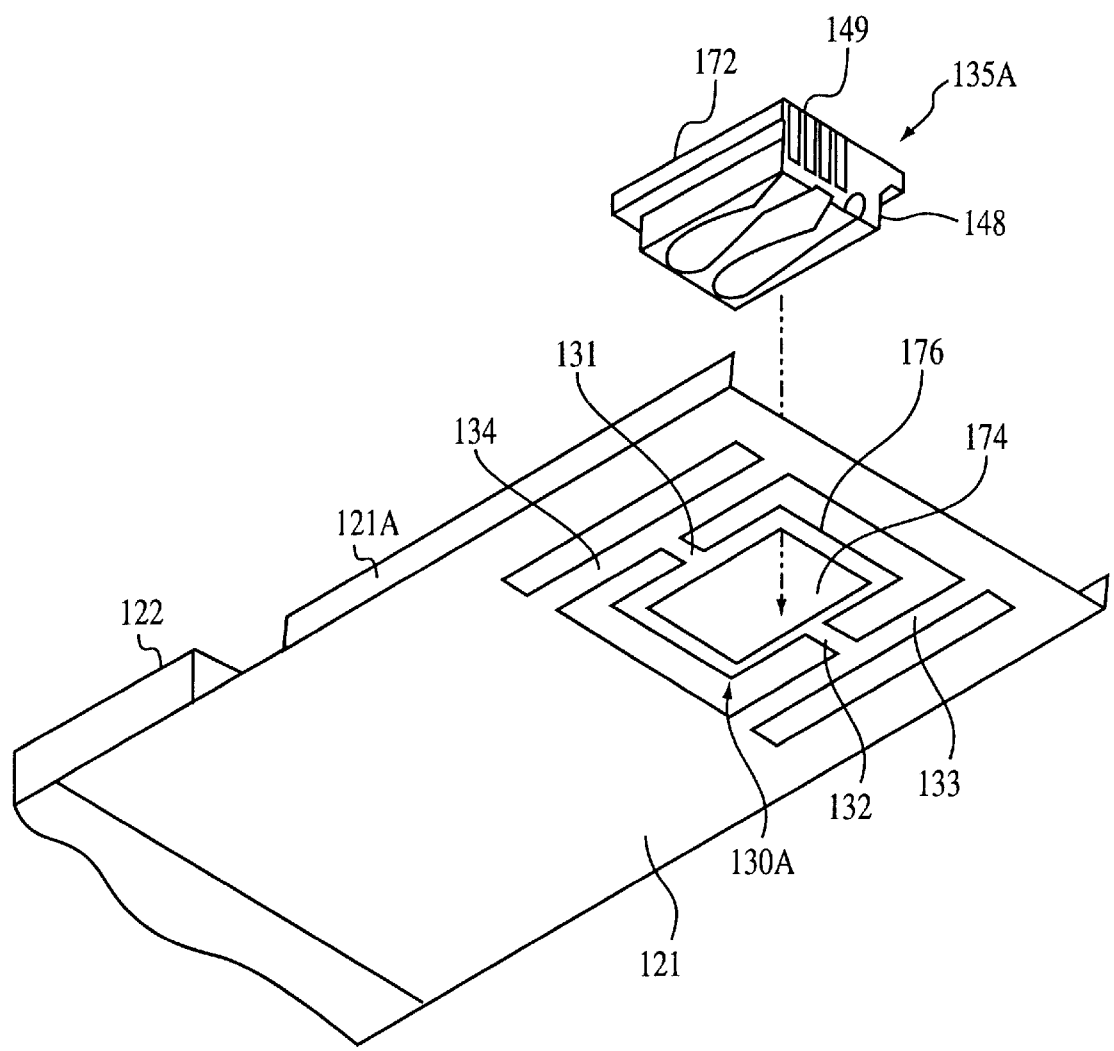
FIG. 31 is a perspective view of a magnetic head assembly according to the twelfth embodiment of the present invention.

FIG. 31 shows a magnetic head suspension unit 170 having a gimbal 171 according to a seventeenth embodiment of the present invention. A magnetic head slider 135A of the mechanism 170 includes flanges 172 and 173 formed on the respective sides of the slider 35A. A magnetic head slider fixing portion 130A of the gimbal 171 includes an opening 174 having a size corresponding to the magnetic head slider 135A. The opening 174 is of a rectangular shape defined by a rectangular frame 176. As shown in FIG. 31, the magnetic head slider 135A engages the opening 174, and the flanges 172 and 173 are made to adhere to the frame 176 by means of an insulation adhesive or an adhesive containing an insulator. In this manner, the magnetic head slider 135A is fixed to the magnetic head slider fixing portion 130A.

Figure 32:
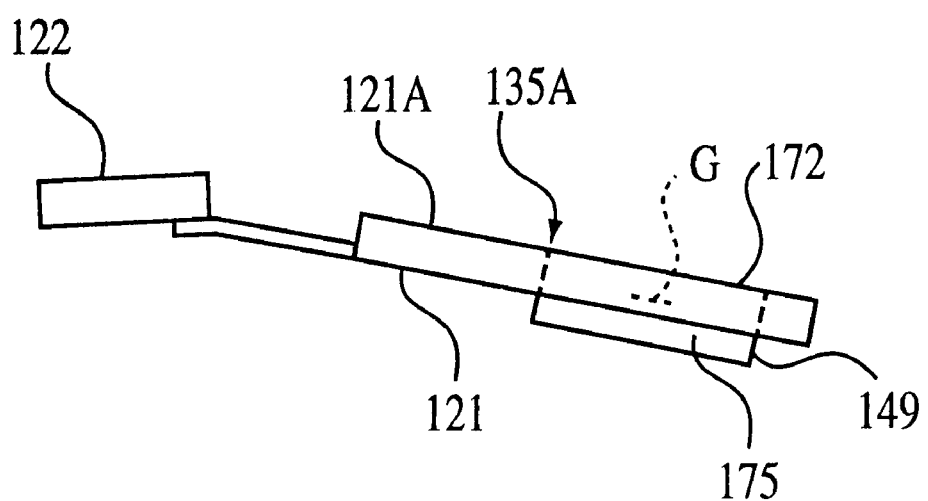
FIG. 32 is a side view of the mechanism shown in FIG. 31.

As shown in FIG. 32, the center G of gravity of the magnetic head slider 135A is substantially located on the surface of the suspension 121. Hence, in a seek operation, the magnetic head slider 135A is moved by exerting a force on the center G of gravity. Thus, an unnecessary rotation force about the center G of gravity of the magnetic head slider 135A does not occur, and the unbalance of the magnetic head slider 135A is reduced. As a result, the magnetic head slider 135A can stably fly in the seek operation.

Further, the height of the magnetic head assembly can be reduced. Hence, it is possible to laminate layers of the head at reduced intervals and to provide an increased number of disks per unit length. As a result, it is possible to increase the volume storage density of the magnetic disk drive and hence the storage density.

Figure 33:
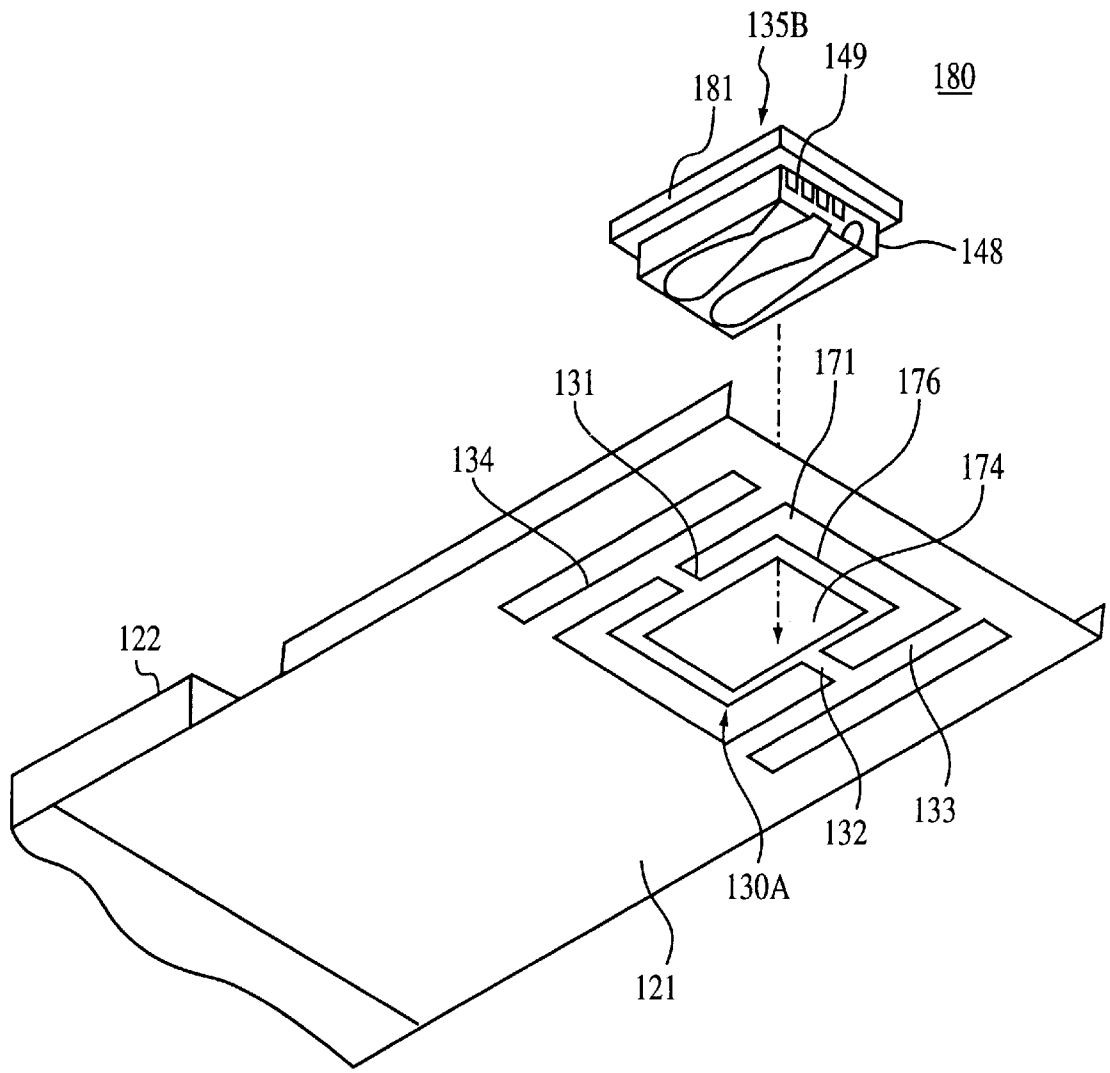
FIG. 33 is a perspective view of a magnetic head assembly according to an eighteenth embodiment of the present invention.

FIG. 33 shows a magnetic head suspension unit 180 having a magnetic head slider 135B according to an eighteenth embodiment of the present invention. The magnetic head slider 135B has a flange 181 formed around the circumference thereof. The magnetic head slider 135B engages the opening 174, and the flange 181 is adhered to the magnetic head slider fixing portion 130A by means of an adhesive which can be an insulation adhesive or an adhesive containing an insulator. That is, the eighteenth embodiment of the present invention differs from the seventeenth embodiment thereof in that the whole circumference of the magnetic head slider 135B is made to adhere to the fixing portion 130A. Hence, the adhesive strength is increased and the reliability of the magnetic head suspension unit is improved.

Figure 34:
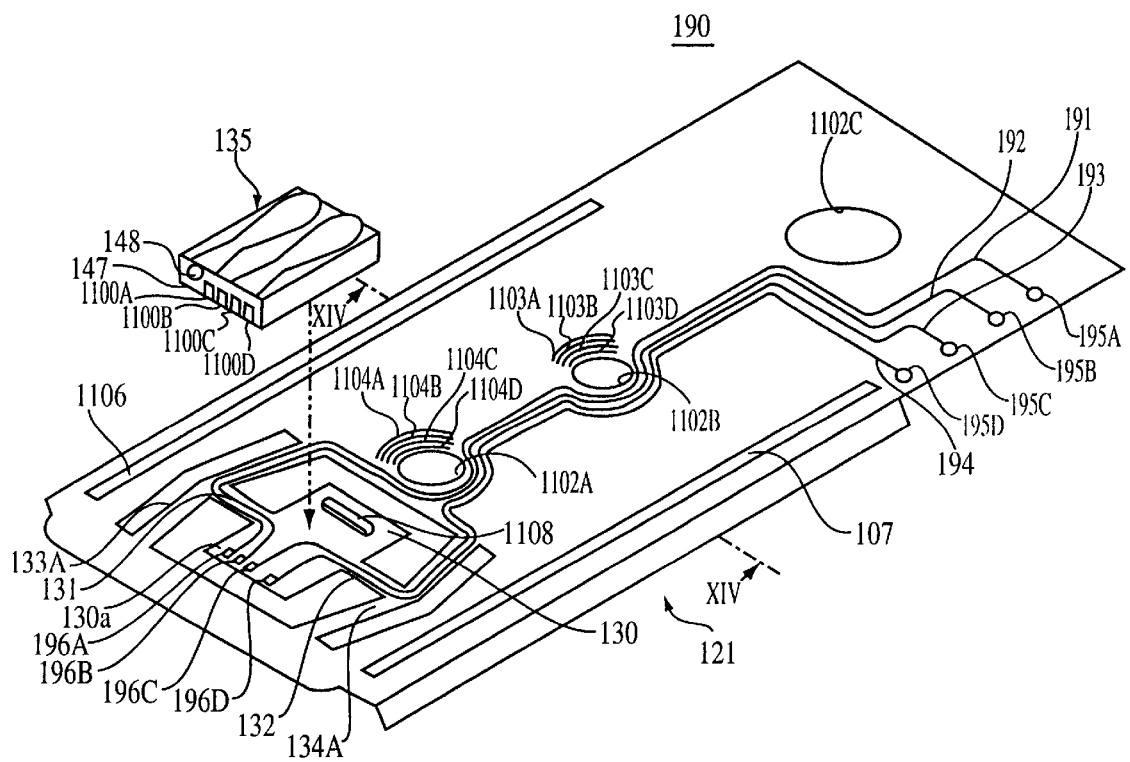
FIG. 34 is a perspective view of a magnetic head assembly according to a nineteenth embodiment of the present invention.
Figure 35:
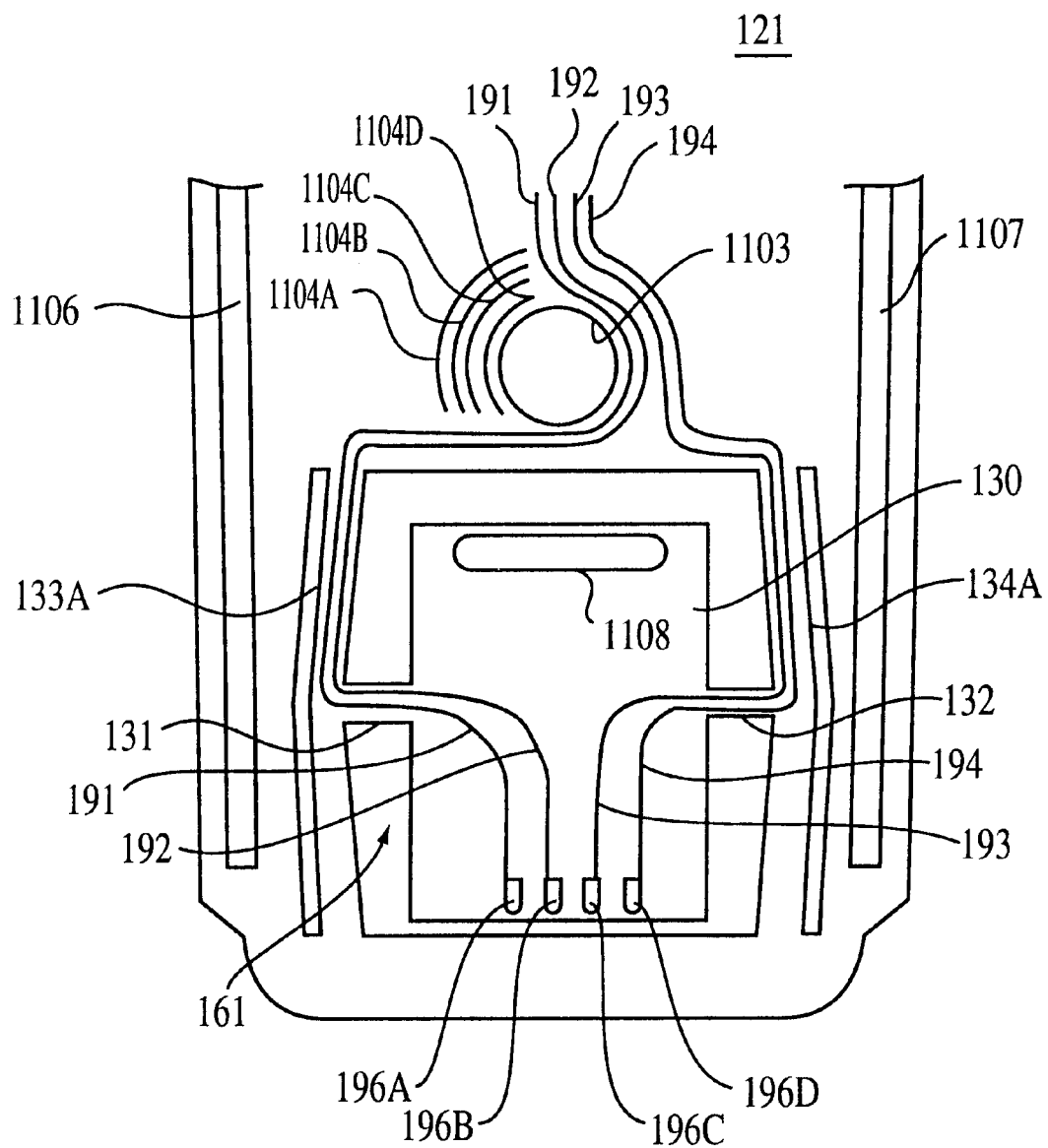
FIG. 35 is a plan view of a free-end part of a suspension shown in FIG. 34.

FIG. 34 shows a magnetic head suspension unit 190 according to a nineteenth embodiment of the present invention. FIG. 35 shows a free end of a suspension of the magnetic head suspension unit 190. The mechanism 190 is designed so that it does not have any influence of the stiffness of lead wires, which affect flying of the slider having a low airbearing stiffness. For example, when, in the case where four lead wires are connected between the slider and the suspension (see FIG. 27), each of the lead wires has a diameter of 30 μm and has an additional length (free length) of 1 mm, the rotation stiffness of the gimbal is approximately five times that of the gimbal in which there is no lead wire. This degrades the flying stability of the slider.

The magnetic head suspension unit 190 has wiring patterns 191, 192, 193 and 194, which are formed by patterning a copper thin film formed by, for example, plating by means of the photolithography technique. The wiring patterns 191–194 extend on a central portion of the lower surface of the suspension 121 in the longitudinal direction. Each of the wiring patterns 191–194 is approximately 5 μm thick and 50 μm wide. The thickness and width of the wiring patterns depend on the resistance of the conductive pattern and the capacity of the suspension 121.

Terminals 195A–195D made of copper are formed on the base portion of the suspension 121. Further, terminals 196A–196D are formed in a terminal area 130a of the magnetic head slider fixing portion 130 of the gimbal 125. The tops of the terminals 195A–195D and 196A–196D are plated by, for example, Au. This plating contributes to preventing exposure of copper and improving the bonding performance. Ends of the wiring patterns 191, 192, 193 and 194 are respectively connected to the terminals 195A, 195B, 195C and 195D. The other ends of the two wiring patterns 191 and 192 extend along the beams 133A and 131, and are connected to the terminals 196A and 196B, respectively. The other ends of the wiring patterns 193 and 194 extend along the beams 134A and 132 and are connected to the terminals 196C and 196D, respectively.

Figure 36:
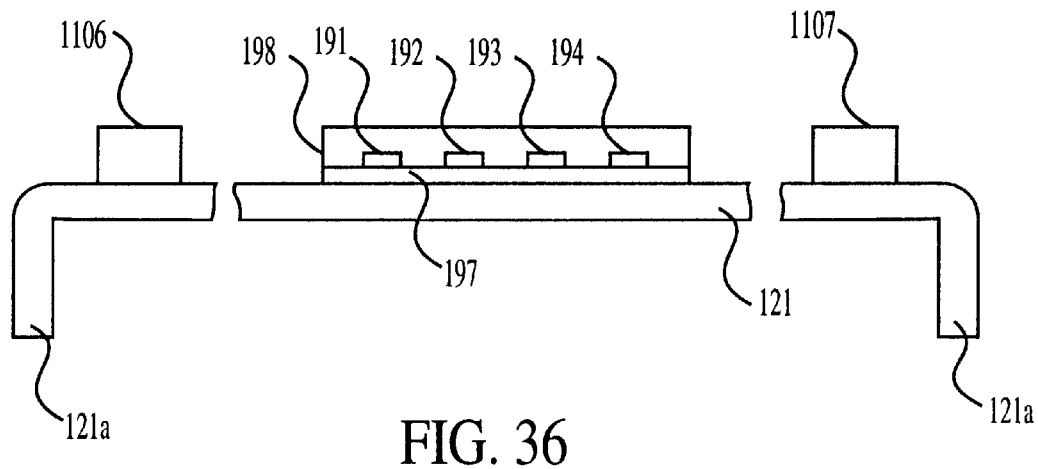
FIG. 36 is a sectional-view taken along a line XIV—XIV shown in FIG. 34.

As shown in FIG. 36, the wiring patterns 191, 192, 193 and 194 are electrically insulated from the suspension 121 by means of an insulating film 197, and are covered by a protection film 198. The insulating film 197 and the protection film 198 are made of photosensitive polyimide and are grown to a thickness of approximately 5 μm. The insulating film 197 and the protection film 198 are respectively patterned by the photolithography technique. The thickness of the insulating film 197 is determined on the basis of a capacitance between the conductive pattern (made of Cu) and the suspension (made of stainless steel).

As will be described later, polyimide has heat-resistance enough for an annealing process. Since polyimide has photosensitivity, it can be easily patterned. Further, the polyimide films 197 and 198 have corrosion resistance, and excellent reliability.

It is likely that the terminals 195A–195D and 196A–196D are etched because these terminals are not covered by the protection film 198. In order to prevent the terminals 195A–195D and 196A–196D from being etched, the surfaces of these terminals are covered by an Au film (not shown) having a thickness of approximately 1 μm formed by plating or vapor deposition.

Figure 37:
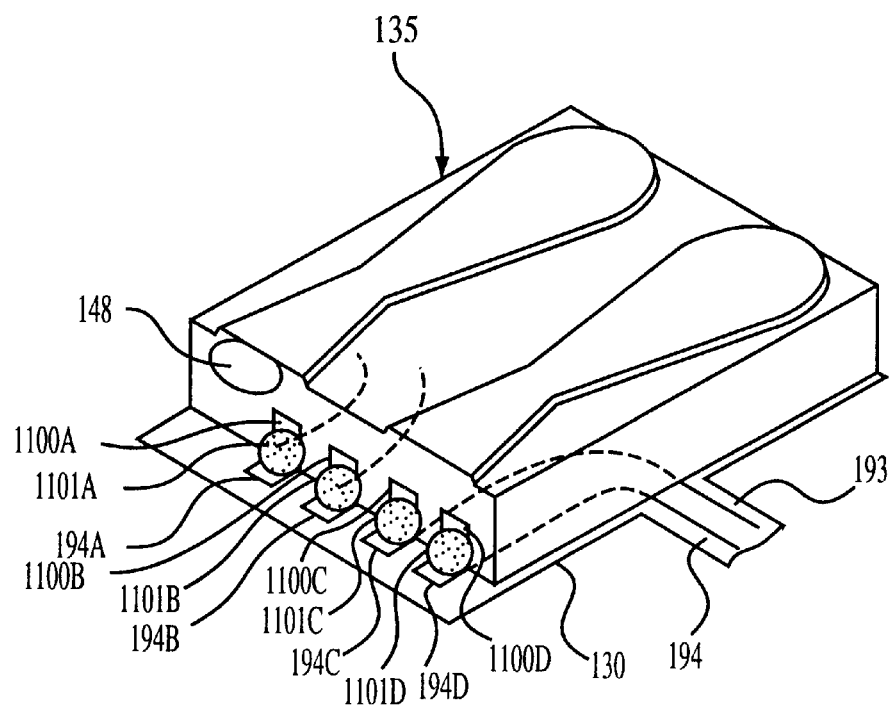
FIG. 37 is a perspective view of a magnetic head slider shown in FIG. 34.

As shown in FIG. 37, the magnetic head slider 135 is made to adhere to the fixing portion 130 by means of an adhesive which can be an insulation adhesive or an adhesive containing an insulator. The terminals 196A–196D are located at a right angle with respect to terminals 1100A–1100D of the magnetic head 148 formed on the end surface of the magnetic head slider 135, and are respectively connected to the terminals 1100A–1100D by means of Au balls 1101A–1101D. The Au balls 1101A–1101D are formed by means of, for example, a gold ball bonding device. In order to facilitate bonding, the terminals 196A–196D and terminals 1100A–1100D are located as shown in FIG. 37. In order to facilitate a crimp operation on the Au balls 1101A–1101D, the terminals 1100A–1100D are long in the direction of the height of the magnetic head slider 135 and are located so that these terminals 1100A–1100D face the terminals 196A–196D in the state where the head slider 135 is fixed to the fixing portion 130.

The wiring patterns 191–194 bypass holes 1102A, 1102B and 1102C, as shown in FIG. 34 and extend up to an area close to the head slider 135. The hole 1102C is used to fix the suspension 121 to the arm 122 (not shown in FIG. 34). The holes 1102A, 1102B and 1102C are sized such that a tool can be inserted therein.

As shown in FIGS. 34 and 35, dummy patterns 1103A–1103D and 1104A–1104D are provided so that these dummy patterns are symmetrical to the bypassing portions of the wiring patterns 191–194 with respect to the holes 1102A and 1102B. The insulating film 197 and the protection film 198 are provided for the dummy patterns 1103A–1103D and 1104A–1104D in the same manner as the wiring patterns 191–194. The dummy patterns 1103A–1103D and 1104A–1104D are provided in order to balance the mechanical stiffness of the suspension 121 in the direction of the width of the suspension 121.

As shown in FIG. 35, the wiring patterns 191–194 are arranged so that these patterns form a loop. This loop functions as an antenna, which receives noise components contained in the head signals. As the size of the loop is increased, the degree of the noise components is increased. In order to reduce the size of the loop, the wiring patterns 191 and 192 respectively connected to the terminals 196A and 196B are arranged between the hole 1102A and the magnetic head slider 135, and all the wiring patterns 191–194 are gathered in the vicinity of the hole 1102A. In order to balance the stiffness in the direction of the width of the suspension, the dummy patterns 1104A–1104D are formed. For the same reason as above, the dummy patterns 1103A–1103D are formed in the vicinity of the hole 1102B.

As shown in FIG. 35, auxiliary films 1106 and 1107 having a belt shape are formed along the right and left ends of the suspension 121. The auxiliary films 1106 and 1107 are provided in order to receive a clamping force generated when the suspension 121 is clamped in a bending process which will be described later. Such a clamping force is also received by the wiring patterns 191–194. The clamping force is distributed so that the clamping force is exerted on not only the wiring patterns 191–194 but also the auxiliary films 1106 and 1107. Hence, it is possible to prevent the wiring patterns 191–194 from being damaged.

As shown in FIGS. 34 and 35, a convex dummy pattern 1108 is provided in order to prevent an adhesive from flowing from the fixing portion 130 when the slider 135 is fixed to the fixing portion 130 and to prevent the slider 135 from being tilted due to the thickness of the wiring patterns. More particularly, the convex pattern 1108 is used to form a groove in which an insulation adhesive used to fix the slider 135 is saved between the pattern 1108 and the terminals 196A–196D. Further, the convex pattern 1108 is designed to have the same height as the patterns having the terminals 196A–196D. If the dummy pattern 1108 is not used, the slider 135 will be inclined with respect to the fixing portion 130 due to the height of the terminals 194A–194D. This degrades the flying stability of the heads. Further, the use of the convex dummy pattern 1108 increases the height of the adhesive to thus improve the insulation performance. The convex pattern 1108 can be formed by a cooper-plated thin film similar to the wiring patterns 191–194. The protection film 198 covers the convex pattern 1108. The adhesive is provided on a step part between the wiring patterns and the convex pattern 1108.

Figure 38:
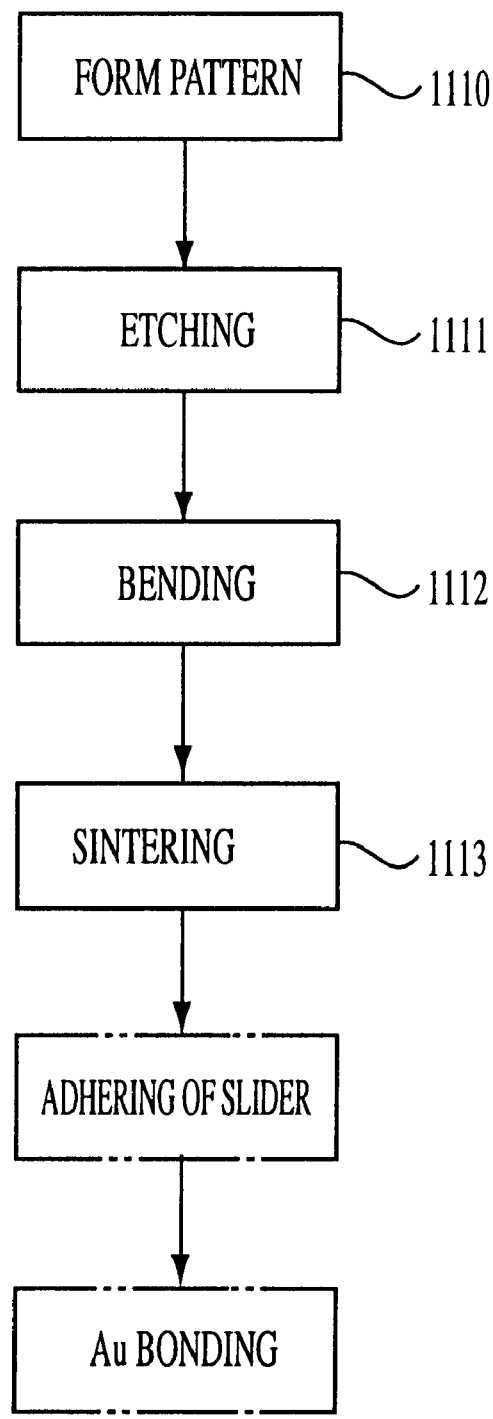
FIG. 38 is a flowchart of a production process for the suspension shown in FIG. 34.

The suspension 121 is produced by a process shown in FIG. 38. First, a pattern formation step 1110 is performed. More particularly, photosensitive polyimide is coated on a stainless plate. The insulating film 197 is formed by the photolithography technique. A copper film is formed by the plating process, the vapor deposition process or the like, and is patterned into the wiring patterns 191–194 by the photolithography technique. Thereafter, photosensitive polyimide is coated and is patterned into the protection film 198 and the auxiliary films 1106 and 1107 by the photolithography technique. Polyimide can be coated by a spin-coat process, and is patterned and etched. A thin film, such as a Cr film, can be formed in order to improve the adhesiveness between the insulating film and the Cu film and between the Cu film and the protection film and to improve the reliability of the adhesion.

Figure 39:
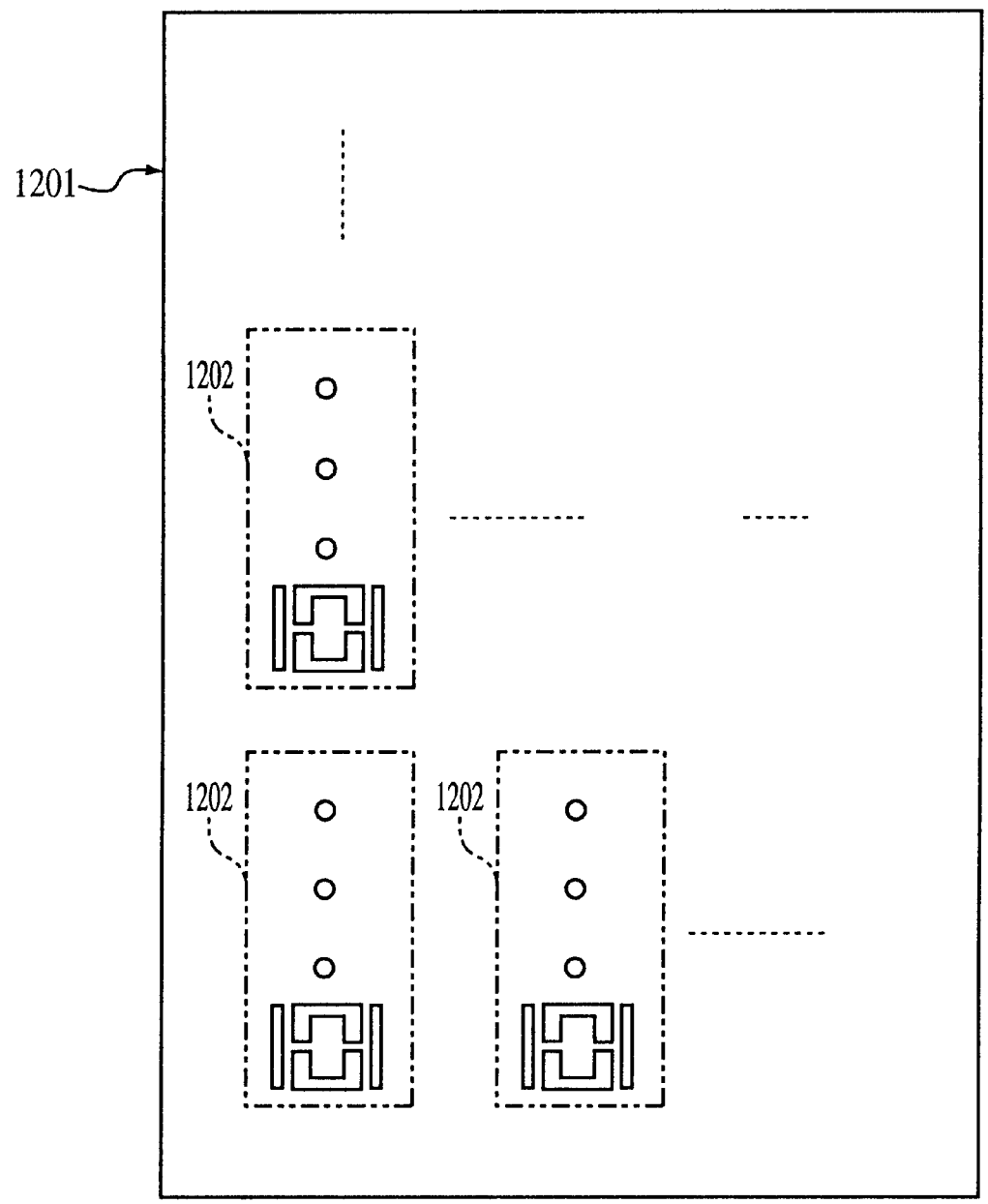
FIG. 39 is a plan view of a plate obtained after an etching step shown in FIG. 38 is carried out.

Next, an etching step 111 is performed in order to form the openings 126–129 and the holes 1102A–1102C and the outward form of the suspension in the stainless plate. FIG. 39 shows suspensions 1202 before punching for cutting off bridge portions (not shown) to provide pieces, so that the suspensions 1202 are formed in a stainless plate 1201 and arranged in rows and columns.

Then, a bending step 1112 is performed by bending the respective ends of each of the suspensions 1202 formed in the stainless plate 1201, so that ribs 121*a* are formed. The bending step 1112 can be performed by press so that the suspensions 1202 are processed at the same time.

Finally, an annealing step 1113 is performed at a temperature of approximately 400° C., so that internal stress can be removed. Further, a slider adhering step and an Au bonding step can be automatically carried out before the suspensions 1202 are punched. Hence, it is possible to automatically perform the production process shown in FIG. 38 and reduce the number of steps and the cost thereof.

Figure 40:
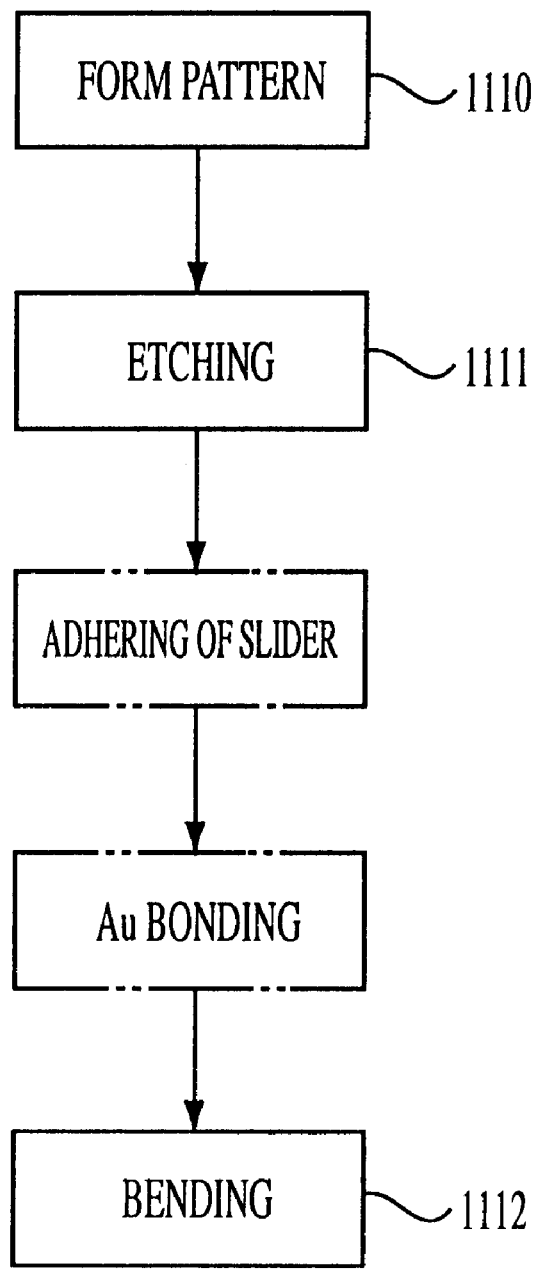
FIG. 40 is a flowchart of another production process for the suspension shown in FIG. 34.

The suspension 121 can be produced without performing the annealing step 1113. In this case, as is shown in FIG. 40, the pattern formation step 1110 and the etching step 1111 are performed, and subsequently the slider adhering step and the Au bonding step are carried out. Thereafter, the bending step 1112 is carried out to form the ribs 121a.

Figure 41:
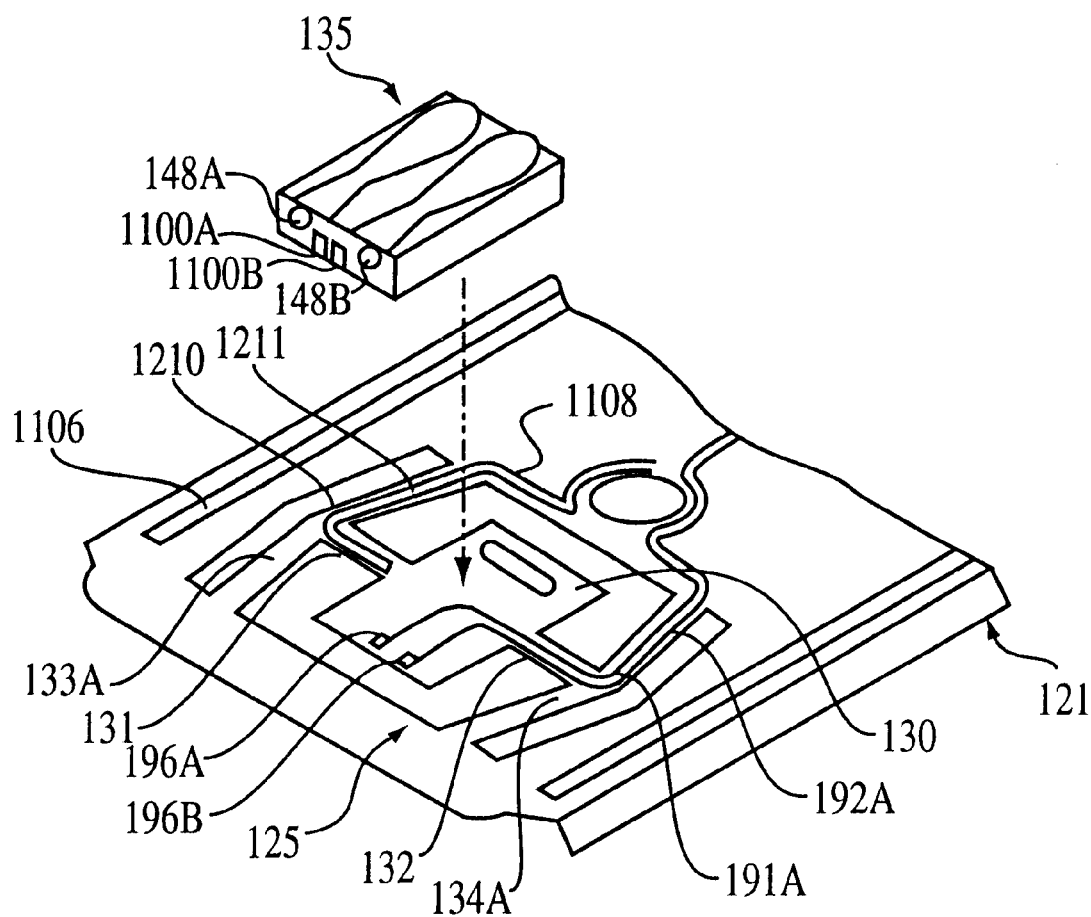
FIG. 41 is a perspective view of a variation of the nineteenth embodiment of the present invention.

As shown in FIG. 41, when interactive type heads 148A and 148B for recording and reproduction are used as magnetic heads, the magnetic head slider 135 has the aforementioned two terminals 1100A and 1100B. In the gimbal 125, the two wiring patterns 191A and 192A are provided so that these wiring patterns extend on only the beams 132 and 134A, while two dummy patterns 1210 and 1211 are provided so as to extend on the beam 131 and 133A in order to balance the mechanical stiffness of the suspension 121 in the direction of the width of the suspension 121.

The magnetic head suspension unit 190 has the following features.

First, since the wiring patterns 191–194 are formed on the suspension 121, it is not necessary to provide tubes for passing the lead wires through the suspension 121. Hence, it is possible to prevent unbalanced force caused by the lead wires and tubes from being exerted on the magnetic head slider 135 and to stably fly the magnetic head slider 135.

Second, due to use of the dummy patterns 1103A–1103D and 1104A–1104D, the rotation stiffness of the suspension 121 does not have polarity. Hence, the magnetic head slider can fly stably.

Third, the crimp connection using the Au balls 1101A–1101D enables automatic assembly and non-wire bonding between head terminals and pattern terminals.

In the aforementioned embodiments of the present invention, the beams may be curved.

A description will now be given of a magnetic head suspension unit suitable for a more compact magnetic disk drive according to a twelfth embodiment of the present invention.

Figure 42:
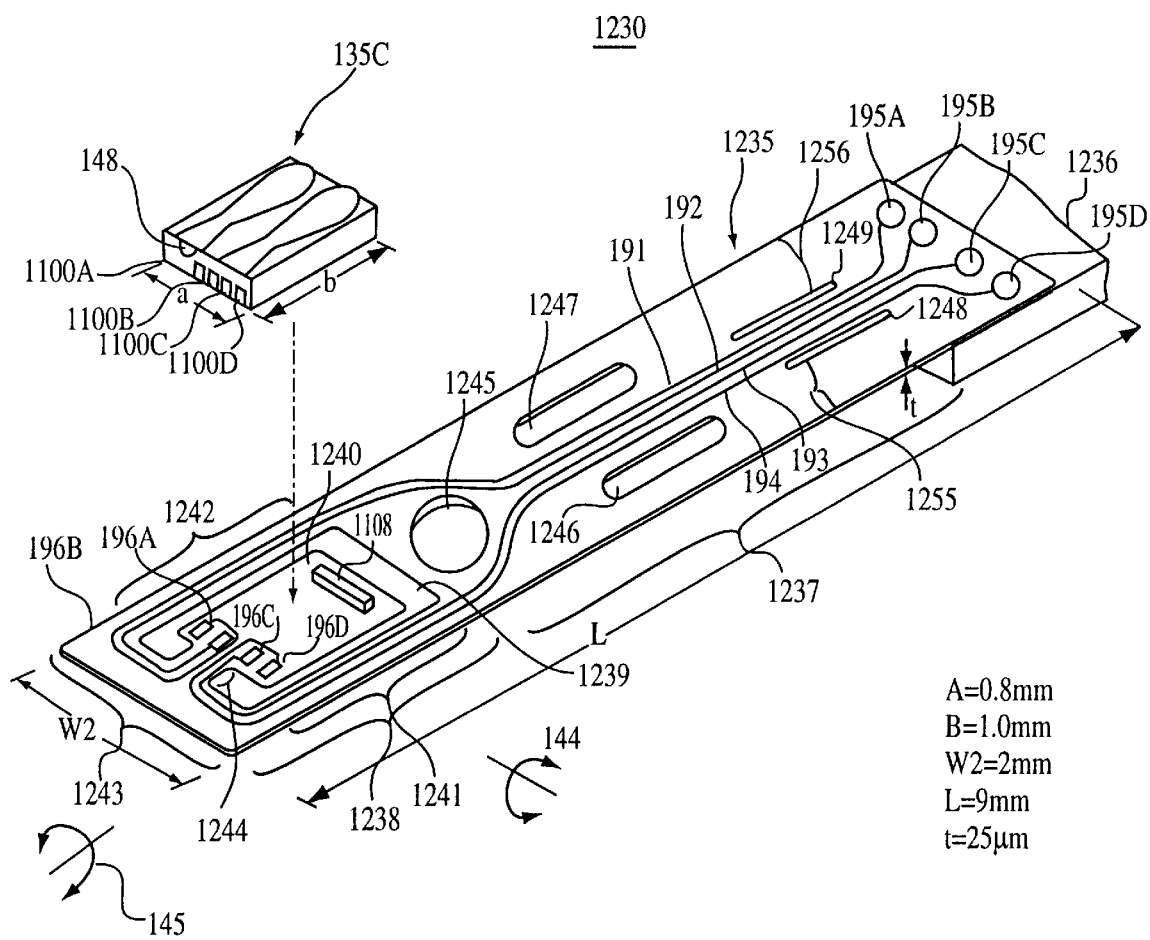
FIG. 42 is a perspective view of a magnetic head assembly according to a twelfth embodiment of the present invention.
Figure 43:
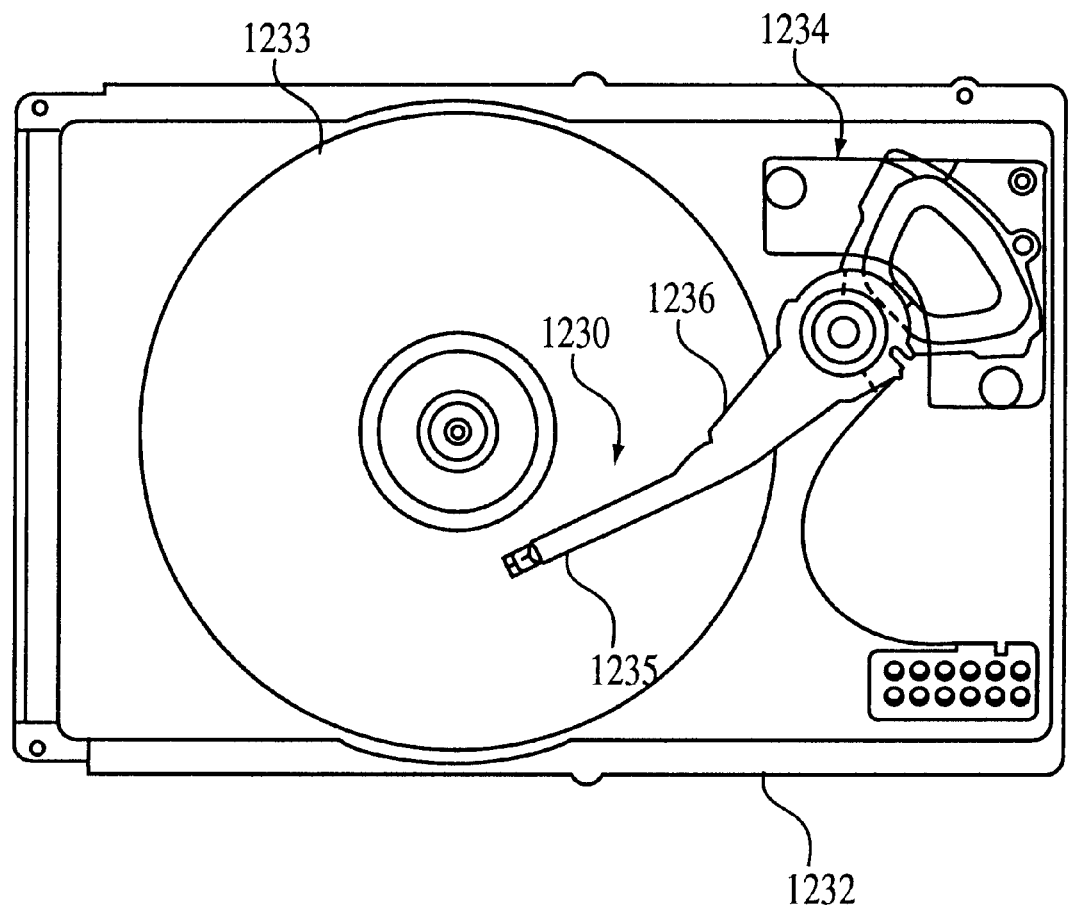
FIG. 43 is a plan view of a magnetic disk drive to which the magnetic head assembly shown in FIG. 42 is applied.

FIG. 42 shows a back surface of a magnetic head suspension unit 1230 according to the twelfth embodiment of the present invention. FIG. 43 shows a 1.8-inch-type magnetic disk drive 1231 to which the magnetic head suspension unit 1230 is applied.

The magnetic disk drive 1231 has an enclosure 1232 having almost the same dimensions as those of an IC memory card. In the enclosure 1232, provided are a magnetic disk 1233 having a diameter of 1.8 inches, and an actuator to which two sets of magnetic head suspension units are attached. The magnetic disk drive 1231 is more compact than the magnetic disk drive 1220 shown in FIG. 3.

A magnetic head slider 135C is made compact in accordance with light-sizing of the magnetic disk drive 1231. More particularly, dimensions a×b of the magnetic head slider 135C are 0.8 mm×1.0 mm, and are approximately one-quarter the area of the magnetic head slider 135 shown in FIG. 23. In order to stably fly the compact magnetic head slider 135C, it is necessary to considerably reduce the stiffness without decreasing the resonance frequency, as compared with the magnetic head suspension unit 130.

A suspension 1235 shown in FIG. 42 is made of stainless steel, and has a base portion fixed to an arm 1236 of the actuator 1234 (see FIG. 43). The suspension 1235 has a width W2 of approximately 2 mm, a length L of approximately 9 mm, and a thickness to of approximately 25 $\mu$m, and is approximately a half of the volume of the suspension 121 shown in FIG. 23. The suspension 1235 is diminished, and hence the resonance frequency of bending which will be described later is high.

The suspension 1235 is a sheet-shaped piece, and a flat plate piece to which a bending process has not been subjected. Hence, there is no problem of a bending process error which degrades the flying stability of the magnetic head slider. The suspension 1235 includes a suspension main body 1237 and a gimbal 1238 located on the end side of the suspension 1235. The gimbal 1238 has a substantially U-shaped opening (through hole) 1239 formed in the suspension 1235. The gimbal 1238 includes a magnetic head slider fixing portion 1240, a first beam 1241, a second beam 1242, a third beam 1244, and a connecting portion 1243.

The magnetic head slider fixing portion 1240 has a size corresponding to the magnetic head slider 135C. The first beam 1241 and the second beam 1242 extend along respective longitudinal ends of the suspension 1235 from the end thereof. The connecting portion 1243 extends in the direction of the width of the suspension 1235, and connects the first beam 1241 and the second beam 1242 together. The third beam 1244 extends from the connecting portion 1243 to the magnetic head slider fixing portion 1240 in the longitudinal direction of the suspension 1235. The magnetic head slider fixing portion 1240 is connected to the main body 1237 of the suspension 1235 via the third beam 1244, the connecting portion 1243 and the first and second beams 1241 and 1242. Hence, the rotation stiffness of the suspension 1230 can be reduced to a small value due to bending of the entire beams.

As shown in FIG. 42, holes 1245, 1246 and 1247 with which a tool is engaged, and a pair of slits 1248 and 1249 are formed in the main body 1237 of the suspension 1235. Adjustment slits 1248 and 1249 are used to reduce the rotation stiffness of the suspension. The holes 1245, 1246 and 1247 and the slits 1248 and 1249 are formed by etching. The connectors 195A–195D, 196A–196D and the wiring patterns 191–194 are formed symmetrically with respect to the longitudinal direction of the suspension 1235. The magnetic head slider 135C is made to adhere to the fixing portion 1240, and the terminals 196A–196D and 1100A–1100D are respectively connected to each other by means of Au balls, as in the case shown in FIG. 37.

The structure shown in FIG. 42 does not use dummy patterns because the length and the width of the suspension 1235 are less than those of the suspension shown in FIG. 34 and the loop formed by the wiring patterns is smaller than that shown in FIG. 34. However, it is preferable to arrange the wiring patterns and provide the dummy patterns as shown in FIGS. 34 and 35 in order to reduce the noise from the heads.

Figure 44A:
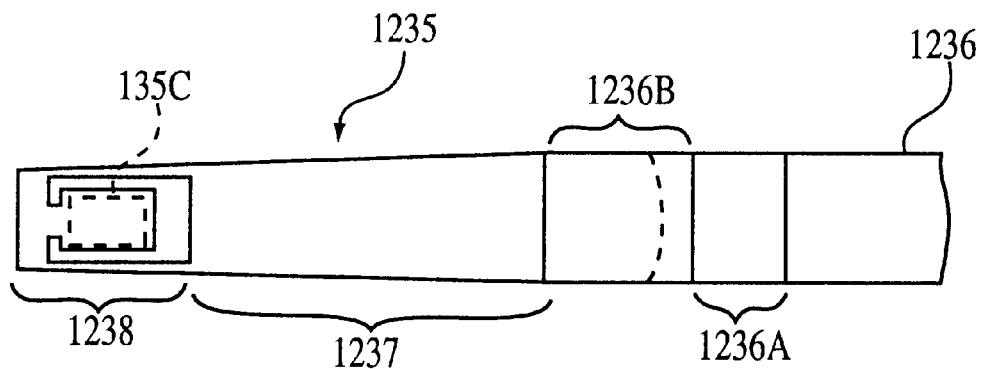
FIGS. 44A and 44B are respectively plan and side views of the magnetic head assembly shown in FIG. 42.
Figure 44B:
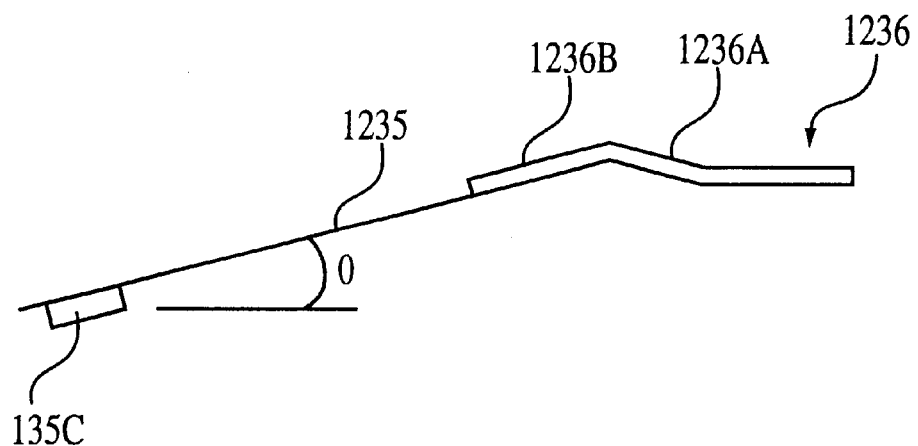

As shown in FIGS. 44A and 44B, the free end of the arm 1236 is bent so that a substantially V-shaped cross section of the arm 1236 is formed in which the "V" is inverted. The free end of the arm 1236 has an upward slant portion 1236a and a downward slant portion 1236b declined at an angle $\theta$ with respect to the horizontal direction.

Figure 45:
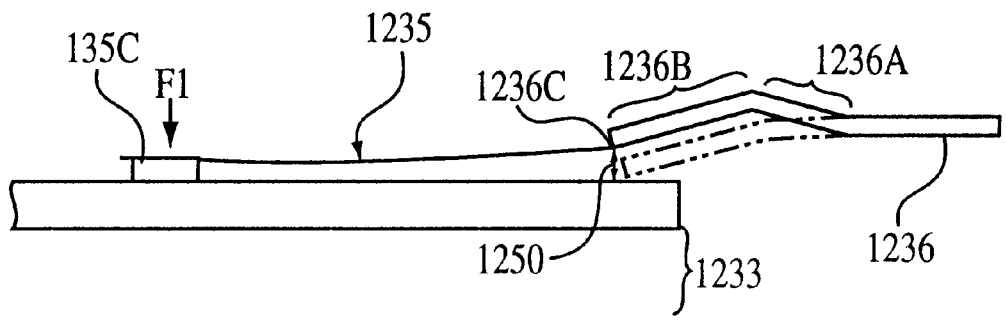
FIG. 45 is a side view of a state observed when the magnetic head assembly shown in FIG. 42 is provided in the magnetic disk drive.

The magnetic disk drive 1231 uses two magnetic head suspension units 1230 so that the single magnetic disk 1233 is sandwiched between the mechanisms 1230. As shown in FIG. 45, the suspension 1235 causes the magnetic head slider 135C to come into contact with the magnetic disk 1233 when the magnetic disk 1233 is not being rotated. At this time, the main body 1237 of the suspension 1235 is caused to be bent and elastically deformed. The elastic force stored in the main body 1237 of the suspension 1235 generates a load F1, which urges the magnetic head slider 35C towards the magnetic disk 1233.

Since the arm 1236 is bent in the form of the inverted "V", a wide gap 1250 can be formed between an end 1236c of the arm 1236 and the magnetic disk 1233, as compared with a case indicated by a two-dot chained line in which the arm 1236 is simply bent downwards.

Figure 46:
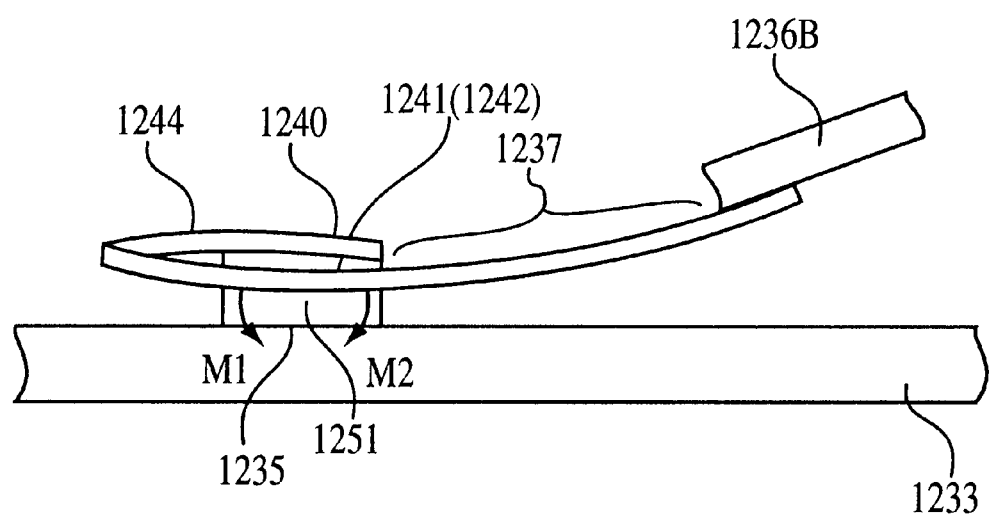
FIG. 46 is an emphasized view of the state in FIG. 45.

A description will now be given of a moment exerted on the magnetic head slider 135C by means of the suspension 1235 when the suspension is loaded on the disk. As shown in FIG. 46, the main body 1237 of the suspension 1235 and the third beam 1244 are bent. Hence, a moment is exerted by a center 1251 of the magnetic head slider 35C. A moment M1 directed counterclockwise is exerted by the suspension main body 1237 and the first and second beams 1241 and 1242. A moment M2 directed clockwise is exerted on the third beam 1244. The dimensions of the suspension 1235 are selected so that the moments M1 and M2 are balanced. For example, the suspension 1235 is 9 mm long, and the gimbal 1238 is 2.5 mm long. Further, the length and width of the main body 1235 of the suspension 1237 are 5.7 mm and 2 mm, respectively. With the above structure, it is possible to stably fly the magnetic head slider 135C.

A description will now be given, with reference to FIG. 42, of pitching and rolling of the magnetic head slider 135C.

(1) Pitching

The magnetic head slider 135C is rotated in the pitching direction indicated by arrow 144 in such a manner that the first, second and third beams 1241, 1242 and 1244 and the suspension main body 1237 are bent. At this time, all the beams 1241, 1242 and 1244 are bent so as to be deformed in the form of arch shapes. The gimbal 1238 is bent and hence the suspension main body 1237 is bent. Hence, the pitch stiffness can be greatly reduced.

(2) Rolling

The magnetic head slider 135C is rotated in the rolling direction indicated by arrow 145 in such a manner that the first and second beams 1241 and 1242 are respectively bent in the opposite directions and the suspension main body 1237 is twisted. At this time, the gimbal 1238 is bent and hence the suspension main body 1237 is bent. Hence, the rolling stiffness can be greatly reduced.

A description will now be given of the first-order bend and the first-order twist of the magnetic head suspension unit 1230 obtained when the suspension is vibrated.

(1) First-order bend

Figure 47:
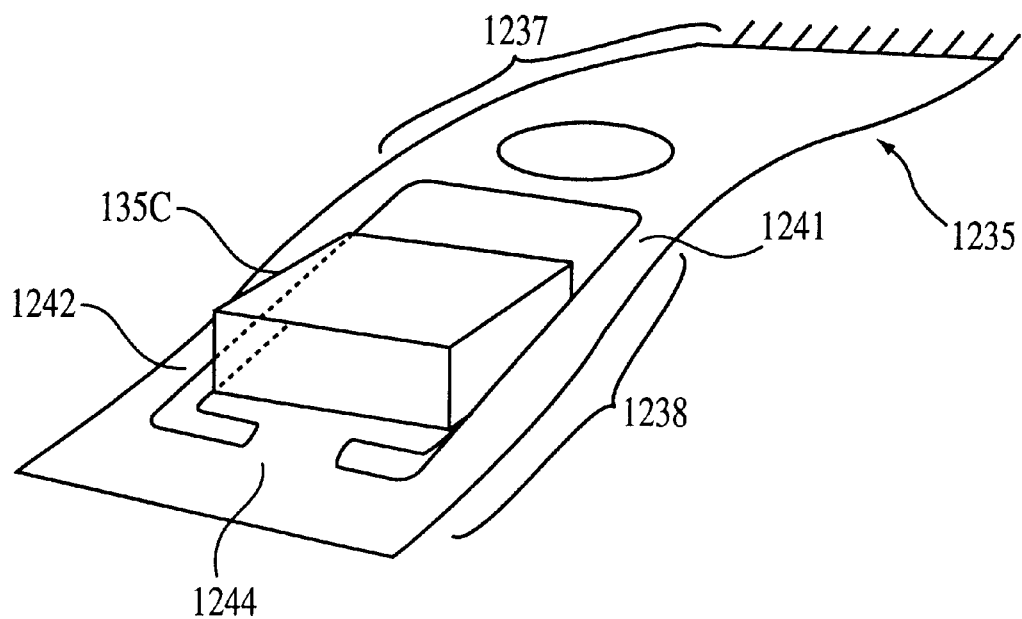
FIG. 47 is a side view of a first-order bend state of a suspension used in the twelfth embodiment of the present invention.

The suspension 1235 is bent and deformed, as shown in FIG. 47. More specifically, the suspension main body 1237, and the first, second and third beams 1241, 1242 and 1244 of the gimbal 1238 are bent as shown in FIG. 45. The overall suspension 1235 is formed flexibly, but the resonance frequency of the first-order bend is high, while the stiffness is small.

(2) First-order twist

Figure 48:
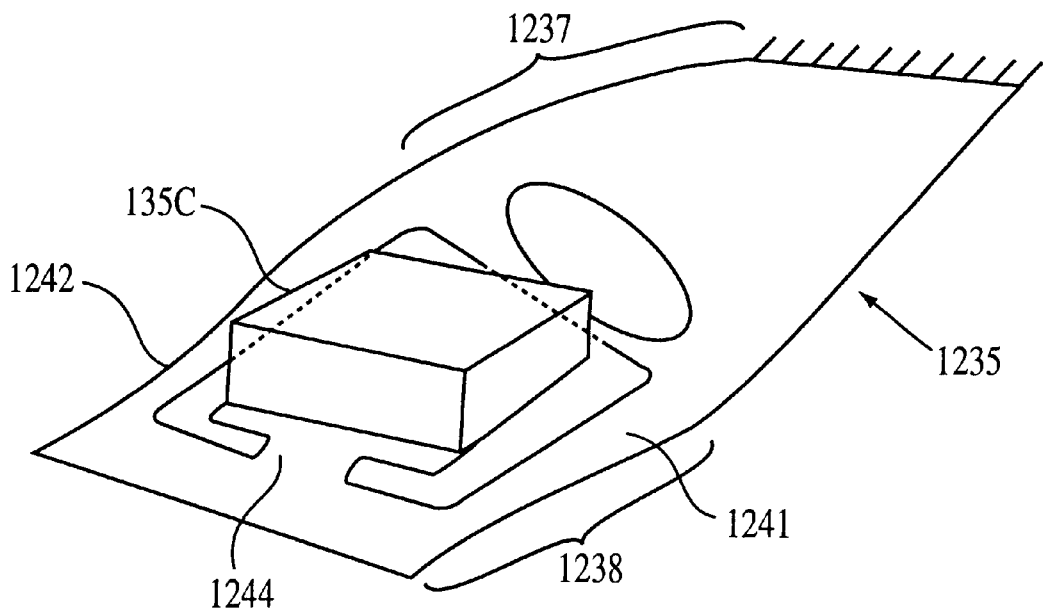
FIG. 48 is a side view of a first-order twist state of the suspension used in the twelfth embodiment of the present invention.

The suspension 1235 is twisted as shown in FIG. 48. The gimbal 1238 is deformed and hence the suspension main body 1237 is deformed. Hence, the overall suspension 1235 is flexibly formed, but the resonance frequency of the first-order twist is high while the stiffness thereof is low.

Tables 3 and 4 show characteristics of the magnetic head support mechanism 1230 according to the twelfth embodiment of the present invention and the magnetic head suspension unit 130 of the fourteenth embodiment thereof shown in FIG. 23.

TABLE 3

COMPARISON OF STIFFNESS
(static characteristics by computer simulation)

| Stiffness | 7th embodiment | 1st embodiment |
|---|---|---|
| pitch stiffness | 0.44 grf cm/rad | 1.5 grf cm/rad |
| roll stiffness | 0.24 grf cm/rad | 1.5 grf cm/rad |
| up/down stiffness | 0.36 grf/mm | 0.55 grf/mm |
| equivalent weight ratio | 0.76 | 0.74 |

TABLE 4

COMPARISON OF RESONANCE FREQUENCY
(dynamic characteristic by computer simulation)

| Stiffness | 7th embodiment | 1st embodiment |
|---|---|---|
| 1st bend | 1.6 kHz | 2.1 kHz |
| 1st twist | 4.4 kHz | 2.3 kHz |
| in-plane | 7.1 kHz | 8.5 kHz |

More particularly, Table 3 the pitch stiffness, the roll stiffness, and the up/down stiffness of the suspension 1235 obtained by means of a computer simulation. It can be from Table 3 that the pitch stiffness and the roll stiffness of the twelfth embodiment of the present invention are approximately one-quarter of those of the fourteenth embodiment thereof.

Table 4 shows the resonance frequencies of the fourteenth and twelfth embodiments of the present invention obtained by a computer simulation. It can be seen from Table 4 that the first-order bend resonance frequency, the first-order twist resonance frequency and the lateral resonance frequency are kept very high.

It can be seen from Tables 3 and 4 that the magnetic head suspension unit 1230 according to the twelfth embodiment of the present invention has a resonance frequency as high as that of the magnetic head suspension unit 130 according to the fourteenth embodiment, and stiffness much less than that of the mechanism 130. Hence, the compact magnetic head slider 135C can be stably flied.

In an alternative of the suspension, the base portion of the suspension 1237 is bent, so that the suspension is supported in the same manner as shown in FIG. 23 and the load F1 shown in FIG. 45 is obtained. In this case, only portions 1255 and 1256 outside of the slits 1248 and 1249 are bent. Hence, unnecessary strain is not exerted on the wiring patterns 191–194 located between the slits 1248 and 1249.

A first variation of the gimbal 1238 of the suspension 1235 will be described. A gimbal $1238_{-1}$ shown in FIG. 49 has a first beam $1244_{-1}$ having a long width A, and an opening $1239_{-1}$ having a long length B. First and second beams $1241_{-1}$ and $1242_{-1}$ are long.

Figure 50:
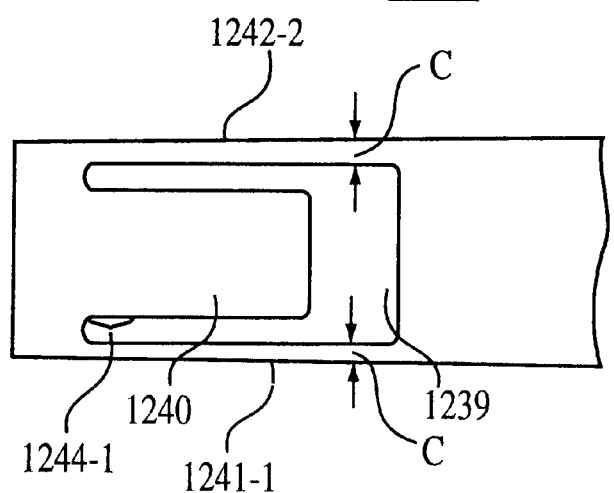
FIG. 50 is a plan view of a second variation of the gimbal of the suspension used in the twelfth embodiment of the present invention.

FIG. 50 shows a second variation $1238_{-2}$ of the gimbal 1238. The gimbal $1238_{-2}$ has first and second beams $1241_{-2}$ and $1242_{-2}$ each having a small width C.

Figure 51:
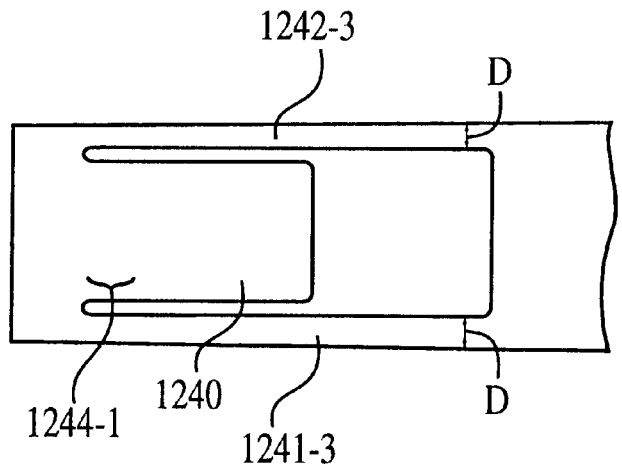
FIG. 51 is a plan view of a third variation of the gimbal of the suspension used in the twelfth embodiment of the present invention.

FIG. 51 shows a third variation $1238_{-3}$ of the gimbal 1238. The gimbal $1238_{-3}$ has first and second variations $1241_{-3}$ and $1242_{-3}$ having a large width D.

Figure 52:
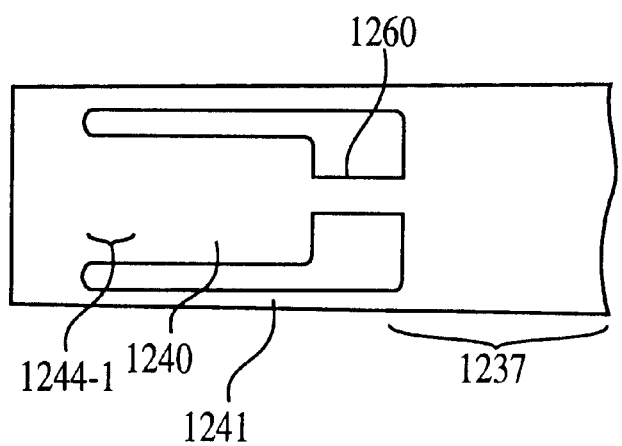
FIG. 52 is a plan view of a fourth variation of the gimbal of the suspension used in the twelfth embodiment of the present invention.

FIG. 52 shows a fourth variation $1238_{-4}$ of the gimbal 1238. The gimbal $1238_{-4}$ has a fourth beam 1260 connecting the center of the end of the magnetic head slider fixing portion 1240 and the suspension main body 1237 together.

The fourth beam 1260 functions to prevent a deformation of the magnetic head slider fixing portion 1240, but increases the rotation stiffness. Hence, it is desired that the width of the fourth beam 1260 be as small as possible and the length thereof are as long as possible.

Figure 53:
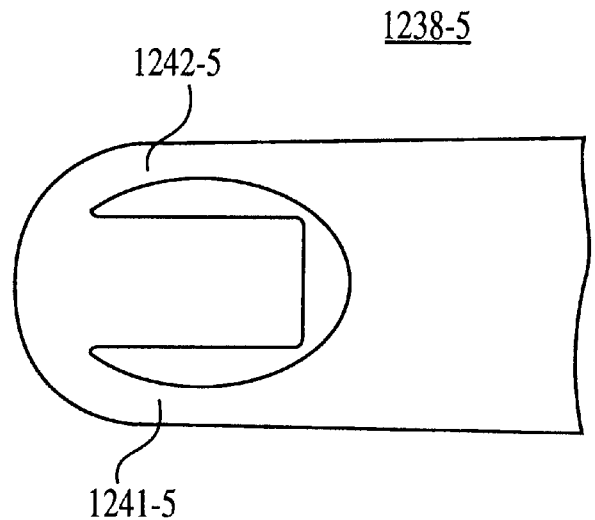
FIG. 53 is a plan view of a fifth variation of the gimbal of the suspension used in the twelfth embodiment of the present invention.

FIG. 53 shows a fifth variation 1238$_{-5}$ of the gimbal 1238. The gimbal 1238$_{-5}$ has first and second arch-shaped beams 1241$_{-5}$ and 1242$_{-5}$.

Figure 54:
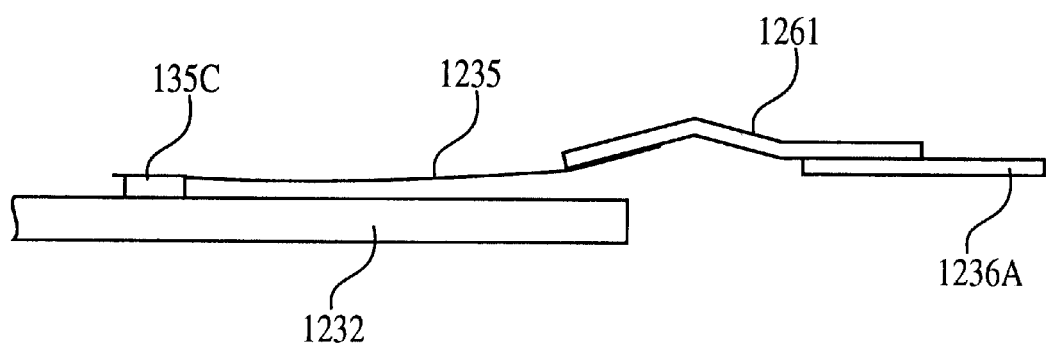
FIG. 54 is a side view of a variation of the twelfth embodiment of the present invention.

As shown in FIG. 54, a bent connecting plate 1261 is fixed to an arm 1236A, and the suspension 1235 is fixed to the connecting plate 1261. Hence, it is not necessary to subject the arm 1236A to bending stresses.

Figure 49:
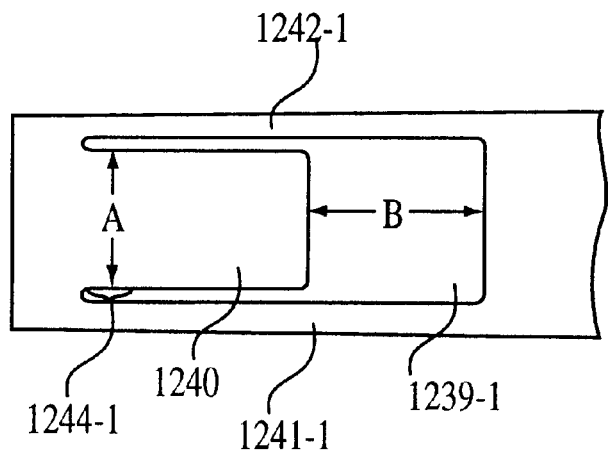
FIG. 49 is a plan view of a first variation of a gimbal of the suspension used in the twelfth embodiment of the present invention.

In the variations shown in FIG. 49 through 132, it can be said that the third beam 1244 shown in FIG. 42 has the same width as the fixing portion 1240 and is integrated with the fixing portion 1240.

In the fourteenth through nineteenth embodiments, the load applied to the magnetic head slider is generated by bending the spring portion of the suspension. Alternatively, it is possible to employ the arm fixing structure used in the twelfth embodiment of the present invention in which the spring portion is kept flat.

The present invention is not limited to the specifically disclosed embodiments and variations, and other variations and modifications may be made without departing from the scope of the present invention.

What is claimed is:

1. A magnetic head assembly comprising:

a slider on which a magnetic head is mounted;

a spring arm having a gimbal portion on which said slider is mounted;

a wiring pattern provided on said spring arm and electrically connected to the magnetic head; and an insulating member provided between said slider and said gimbal portion of said spring arm, said insulating member insulating substantially the entire interface between said slider and said gimbal portion; and said head is electrically connected to said wiring pattern via terminals on a side portion of the head.

2. The magnetic head assembly as claimed in claim 1, wherein said insulating member comprises an insulation adhesive, the composition and thickness of said insulation adhesive being selected to provide an insulation layer having high electrical resistance.

3. The magnetic head assembly as claimed in claim 1, wherein said insulating member comprises an adhesive containing an insulator.

4. The magnetic head assembly as claimed in claim 1, wherein said insulating member comprises:

a projection which has an insulation surface and is mounted on the gimbal portion; and an adhesive which fixes the slider which is in contact with said insulation surface of the projection to the gimbal portion.

5. The magnetic head assembly as claimed in claim 4, wherein said adhesive is substantially flush with said insulation surface of the projection.

6. A magnetic head assembly comprising:

a slider on which a magnetic head is mounted;

a spring arm having a gimbal portion on which said slider is mounted, said gimbal portion including a recess portion configured to increase the flexibility of said gimbal portion;

a wiring pattern provided on said spring arm and electrically connected to the magnetic head; and an adhesive provided between said gimbal portion and said slider, said adhesive being partially or fully provided in said recess portion.

7. The magnetic head assembly as claimed in claim 6, wherein said recess portion comprises at least one through hole formed in said gimbal portion.

8. The magnetic head assembly as claimed in claim 6, wherein said recess portion comprises at least one longitudinal hole formed in said gimbal portion.

9. The magnetic head assembly as claimed in claim 6, wherein said recess portion comprises at least one circular hole formed in said gimbal portion.

10. The magnetic head assembly as claimed in claim 6, wherein said recess portion comprises a rectangular through hole formed in said gimbal portion.

11. The magnetic head assembly as claimed in claim 6, wherein said gimbal portion is integrally formed with said spring arm.

12. A magnetic disk drive comprising:

an enclosure;

a magnetic disk provided in said enclosure;

a magnetic head assembly provided in said enclosure; and an actuator to which said magnetic head assembly is fixed, said actuator moving said magnetic head assembly above said magnetic disk, said magnetic head assembly comprising:

a slider on which a magnetic head is mounted;

a spring arm having a gimbal portion on which said slider is mounted;

a wiring pattern provided on said spring arm and electrically connected to the magnetic head; and an insulating member provided between said slider and said gimbal portion of said spring arm, said insulating member insulating substantially the entire interface between said slider and said gimbal portion; and said magnetic head is electrically connected to said wiring pattern via terminals on a side portion of said magnetic head.

13. A magnetic disk drive comprising:

an enclosure;

a magnetic disk provided in said enclosure;

a magnetic head assembly provided in said enclosure; and an actuator to which said magnetic head assembly is fixed, said actuator moving said magnetic head assembly above said magnetic disk, said magnetic head assembly comprising:

a slider on which a magnetic head is mounted;

a spring arm having a gimbal portion on which said slider is mounted, said gimbal portion including a recess portion configured to increase the flexibility of said gimbal portion;

a wiring pattern provided on said spring arm and electrically connected to the magnetic head; and an adhesive provided between said gimbal portion and said slider, said adhesive being partially or fully provided in said recess portion.

* * * * *